United States Patent
Fernandes

(10) Patent No.: US 11,265,552 B1
(45) Date of Patent: Mar. 1, 2022

(54) BLOCK-BASED LOW LATENCY RATE CONTROL

(71) Applicant: Apple Inc., Cupertino, CA (US)

(72) Inventor: Felix C. Fernandes, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/031,750

(22) Filed: Sep. 24, 2020

Related U.S. Application Data

(60) Provisional application No. 62/907,223, filed on Sep. 27, 2019.

(51) Int. Cl.
| | | |
|---|---|---|
| *H04N 11/02* | (2006.01) | |
| *H04N 19/147* | (2014.01) | |
| *H04N 19/176* | (2014.01) | |
| *H04N 19/124* | (2014.01) | |

(52) U.S. Cl.
CPC ......... *H04N 19/147* (2014.11); *H04N 19/124* (2014.11); *H04N 19/176* (2014.11)

(58) Field of Classification Search
CPC .................................................. H04N 19/147
USPC ...................................... 375/240.01–240.29
See application file for complete search history.

(56) References Cited

U.S. PATENT DOCUMENTS

| | | | | |
|---|---|---|---|---|
| 2005/0141773 A1* | 6/2005 | Mizuno | ............... | H04N 19/1883 382/239 |
| 2006/0159355 A1* | 7/2006 | Mizuno | ................ | H04N 19/184 382/239 |
| 2006/0159357 A1* | 7/2006 | Mizuno | ................ | H04N 19/645 382/239 |
| 2007/0217699 A1* | 9/2007 | Mahiar | .............. | H04N 19/1883 382/232 |
| 2008/0072261 A1* | 3/2008 | Ralston | ................. | H04L 65/602 725/62 |
| 2017/0289551 A1* | 10/2017 | Lee | ......................... | H04N 19/51 |

OTHER PUBLICATIONS

Xuan Jing, et al., "Frame Complexity-Based Rate-Quantization Model for H.264/AVC Intraframe Rate Control", IEEE Signal Processing Letters, vol. 15, 2008, pp. 373-376.

(Continued)

*Primary Examiner* — Leron Beck
(74) *Attorney, Agent, or Firm* — Robert C. Kowert; Kowert, Hood, Munyon, Rankin & Goetzel, P.C.

(57) ABSTRACT

Block-based, low latency rate control for an encoding system in which a wavelet transform decomposes pixel blocks into subbands stored as subbands in wavelet blocks (WBs) for encoding. Quantization parameters (QPs) for the subbands in each WB are estimated using a method that minimizes wavelet-inverse distortion given a rate bound. For each subband, a rate curve is generated based on an unquantized DCT histogram and bit count statistics for the subband, and a distortion curve is generated based on the unquantized DCT histogram and a distortion estimate for the subband that is estimated using a masked estimator. Once the rate-distortion curves for the subbands are generated, a bisection search may be used to find a point on each curve where the slope is the same for all the curves. The QPs associated with those equally sloped points are the global minimizing QPs for the wavelet block.

20 Claims, 15 Drawing Sheets

(56) References Cited

OTHER PUBLICATIONS

Vivienne Sze, et al., "High Efficiency Video Coding (HEVC): Algorithms and Architectures", Integrated Circuits and Systems, Springer, 2014, pp. 1-375.

Majid Rabbani, et al., "An Overview of the JPEG 2000 still image compression standard", Signal Processing: Image Communication 17, 2002, pp. 3-48.

A. Ortega, et al., "Notes on "Rate-Distortion Methods for Image and Video Compression"", IEEE Signal Processing Magazine, Nov. 1998, pp. 23-50.

Kannan Ramchandran, et al., "Best Wavelet Packet Bases in a Rate-Distortion Sense", IEEE Transactions on Image Processing, vol. 2, No. 2, Apr. 1993, pp. 160-175.

Bryan Usevitch, "Optimal Bit Allocation for Biorthogonal Wavelet Coding", Proceedings of Data Compression Conference-DCC'96. IEEE, 1996, pp. 387-395.

\* cited by examiner

*Masks using (1,2) normalization:*

```
'LLLL'
mask =    [    0           0           0           0           0;
               0           0.39063     1.71875     0.39063     0;
               0           1.71875     7.56250     1.71875     0;
               0           0.39063     1.71875     0.39063     0;
               0           0           0           0           0];
'LLLH'
mask =    [    0           0           0           0           0;
               0.02441    -0.15625     0.57617    -0.15625     0.02441;
               0.10742    -0.68750     2.53516    -0.68750     0.10742;
               0.02441    -0.15625     0.57617    -0.15625     0.02441;
               0           0           0           0           0];
'LLHL'
mask =    [    0           0.02441     0.10742     0.02441     0;
               0          -0.15625    -0.68750    -0.15625     0;
               0           0.57617     2.53516     0.57617     0;
               0          -0.15625    -0.68750    -0.15625     0;
               0           0.02441     0.10742     0.02441     0];
'LLHH'
mask =    [    0.00153    -0.00977     0.03601    -0.00977     0.00153;
              -0.00977     0.06250    -0.23047     0.06250    -0.00977;
               0.03601    -0.23047     0.84985    -0.23047     0.03601;
              -0.00977     0.06250    -0.23047     0.06250    -0.00977;
               0.00153    -0.00977     0.03601    -0.00977     0.00153];
'LH'
mask =    [    0           0           0           0           0;
               0.00391    -0.03125     0.17969    -0.03125     0.00391;
               0.02344    -0.18750     1.07813    -0.18750     0.02344;
               0.00391    -0.03125     0.17969    -0.03125     0.00391;
               0           0           0           0           0];
'HL'
mask =    [    0           0.00391     0.02344     0.00391     0;
               0          -0.03125    -0.18750    -0.03125     0;
               0           0.17969     1.07813     0.17969     0;
               0          -0.03125    -0.18750    -0.03125     0;
               0           0.00391     0.02344     0.00391     0];
'HH'
mask =    [    0.00024    -0.00195     0.01123    -0.00195     0.00024;
              -0.00195     0.01562    -0.08984     0.01562    -0.00195;
               0.01123    -0.08984     0.51660    -0.08984     0.01123;
              -0.00195     0.01562    -0.08984     0.01562    -0.00195;
               0.00024    -0.00195     0.01123    -0.00195     0.00024];
```

*FIG. 11*

*Low-complexity masks after thresholding :*

```
'LLLL':   0         1.71875    0
          1.71875   7.56250    1.71875
          0         1.71875    0

'LLLH':   0         0.57617    0
         -0.68750   2.53516   -0.68750
          0         0.57617    0

'LLHL':   0        -0.68750    0
          0.57617   2.53516    0.57617
          0        -0.68750    0

'LLHH':   0        -0.23047    0
         -0.23047   0.84985   -0.23047
          0        -0.23047    0

BLOCK-BASED LOW LATENCY RATE CONTROL

PRIORITY INFORMATION

This application claims benefit of priority of U.S. Provisional Application Ser. No. 62/907,223 entitled "BLOCK-BASED LOW LATENCY RATE CONTROL" filed Sep. 27, 2019, the content of which is incorporated by reference herein in its entirety.

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, mixed reality (MR) combines computer generated information (referred to as virtual content) with real world images or a real world view to augment, or add content to, a user's view of the world, or alternatively combines virtual representations of real world objects with views of a three-dimensional (3D) virtual world. The simulated environments of virtual reality and/or the mixed environments of mixed reality may thus be utilized to provide an interactive user experience for multiple applications.

SUMMARY

Various embodiments of a video encoding system are described that encode high-resolution video sources at low latencies for transmission over a communications link (e.g., a wireless link) to a device for decoding and display. An example application of the video encoding system is in virtual reality (VR) or mixed reality (MR) systems in which video frames containing virtual content are rendered, encoded, and transmitted by a base station to a device (e.g., a notebook or laptop computer, pad or tablet device, smartphone, or head-mounted device (HMD) such as a headset, helmet, goggles, or glasses that may be worn by a user) for decoding and display.

In some embodiments, the video encoding system includes a wavelet transform component that performs a two-level wavelet transform that decomposes blocks of pixels (e.g., 128×128 pixel blocks) from a strip of a frame into multiple different subbands (e.g., seven subbands (LLLL, LLLH, LLHL, LLHH, LH, HL, and HH) represented by sixteen 32×32 subblocks (CTUs) in a wavelet block), followed by a block-based encoder such as an HEVC (high-efficiency video coding, also known as H.265) encoder that encodes the subbands (i.e., the seven subbands represented in the 16 CTU blocks). The encoded frequency data is sent to a wireless interface that packetizes the encoded frequency data and transmits the packets to the receiving device. On the receiving device, the encoded data is de-packetized and passed through a block-based decoder to recover the subbands. Wavelet synthesis is then performed on the recovered subbands to reconstruct the pixel data for display. Note that HEVC encoding may be lossy, and thus there may be "distortion" when comparing the reconstructed video data to the original video data.

In embodiments, to perform rate control under the strict latency and memory requirements of a VR/MR system, instead of working over a time constant of a strip, frame, or two frames to adjust encoder parameters, the rate control component may determine encoder parameters for each block in a frame (e.g., a quantization parameter for each subblock (CTU) in the block) based at least in part on statistics or metrics received from the encoder pipeline, wireless interface, and complexity analysis.

In some embodiments, rate control statistics for one or more previously processed blocks may be stored to a memory. Stored statistics for co-located blocks (e.g., quantization parameters for the subblocks in the blocks) may be used by the rate control component in determining quantization parameters for a current block being processed in the video encoding system. In some embodiments, complexity statistics for the current block may be determined and used by the rate control component to adjust the quantization parameters from a co-located block to generate the quantization parameters for the current block.

In embodiments of a rate control component as described herein, the quantization parameters for the subblocks in a block may be calculated globally to jointly optimize bandwidth usage and the overall displayed quality of the video data after decoder reconstruction and wavelet synthesis is performed on the target device. Embodiments of the rate control component may implement a method for rate allocation between the subblocks in a block that estimates quantization parameters (QPs) for the subblocks in a block (e.g., QPs for the 16 CTUs in a wavelet block (WB)) to minimize wavelet-inverse distortion given a rate bound for the wavelet block:

$$\substack{minimize \\ QP_0,\ldots,QP_{15}} \|W^{-1}(WB) - W^{-1}H^{-1}H(WB)\|_2^2,$$
$$\text{subject to } \Sigma_{n=0}^{15} R_n \leq R_{wbTarget} \quad (1)$$

where $W^{-1}$ is the inverse wavelet transform, H is the HEVC encoding of $CTU_n$ with $QP_n$ for $0<=n<=15$, is the HEVC decoding of encoded $CTU_n$ for $0<=n<=15$, $R_n$ is the number of bits required to HEVC-encode $CTU_n$ with $QP_n$, and $R_{wbTarget}$ is the target rate bound for the wavelet block.

Embodiments of the rate control component may implement a method to estimate the global minimizing QPs for a wavelet block in which, for each subblock of the wavelet block (i.e., the 16 CTUs), a curve is generated (referred to as a rate-distortion curve) that maps the distortion and the number of bits (rate) for that CTU. A given point on a rate-distortion curve indicates distortion at a given bit rate for the corresponding CTU. Once the rate-distortion curves for the 16 CTUs are generated, the rate control component finds a point on each curve where the slope is the same for all the rate-distortion curves. The QPs associated with those equally sloped points are the 16 global minimizing QPs for the wavelet block.

To generate the rate-distortion curves for the 16 CTUs, a rate curve and a distortion curve needs to be determined for each CTU. The encoder pipeline provides encoding statistics for each CTU to the rate control component, the encoding statistics including a discrete cosine transform (DCT) histogram (a histogram of unquantized DCT coefficients for the CTU), bit count statistics, and a distortion estimate. A key observation is that all of the quantized histograms can be derived from the unquantized histogram. Thus, the unquantized DCT histogram can be used to extrapolate the rate-distortion curves for a respective CTU at any QP. The rate-distortion curves for the 16 CTUs of a wavelet block in a current frame may be stored to a memory and used to estimate the QPs for a co-located wavelet block in a next frame. Complexity metrics determined for a current wavelet block may be used to correct the stored statistics from the co-located wavelet block of a previous frame.

Embodiments of a method for determining the rate curves for the CTUs are described. In embodiments, the histogram of unquantized DCT coefficients for a CTU is represented as a power-of-two bin structure that stores the absolute value of the coefficients. The power-of-two bin structure allows relatively simple rate and distortion estimates to be performed in hardware by the rate control component. The bit count statistics are also stored. When estimating the QPs for a wavelet block in a current frame, the rate curves for the CTUs may be estimated from the respective DCT histograms and bit count statistics stored by the encoder.

Embodiments of a method for determining the distortion curves for the CTUs when using a biorthogonal wavelet transform to generate the subbands are also described. Embodiments may implement a method for efficient, accurate, estimation of mean-squared error (MSE) in biorthogonal, wavelet transforms. The encoder pipeline encodes one CTU (also referred to as a subblock) at a time, and provides a distortion estimate for that CTU to the rate control component. However, the distortion that is of interest is the distortion after decoding and wavelet synthesis is performed on the entire block (all 16 CTUs) at the target device. Thus, a challenge is to estimate the contribution of the distortion in one CTU to the distortion at the target device which comes from the wavelet synthesis of all 16 decoded CTUs. Embodiments of a masked estimator are described that may be used to estimate the MSEs for the 16 CTUs. The masked estimator may implement a 5×5 weight mask for each subband generated by the biorthogonal wavelet transform. The 5×5 masks weight the errors and their correlations. Within a subband, the 5×5 mask computes intra-subband error energy, and thus includes intra-subband correlations in the distortion estimate. The distortion estimates (MSEs) for the 16 CTUs may then be used to estimate the distortion curves for the respective wavelet block.

In some embodiments, the 5×5 masks may be simplified to generate low-complexity weight masks; the masked estimator can then apply these low-complexity masks to each CTU in a wavelet block to generate distortion estimates for the CTUs. The low-complexity masks approximate the 5×5 masks with only five non-zero weights at the center, above center, below center, left of center, and right of center. For the LLLL, LLHH and HH subbands, the low-complexity masks require only two multiplies and four additions. For the LLLH, LLHL, HL and LH subbands, the low-complexity masks require only three multiplies and four additions. Within a subband, the low-complexity mask computes intra-subband error energy, and thus includes intra-subband correlations in the distortion estimate. The distortion estimates (MSEs) for the 16 CTUs may then be used to estimate the distortion curves for the respective wavelet block.

While embodiments of the masked estimator are described herein in the context of a low-latency, block-based rate control method for an encoder that performs a wavelet transform on pixel blocks prior to encoding, embodiments of the masked estimator may also be used in any application to estimate distortion/MSE for biorthogonal wavelet transforms.

While embodiments of methods for determining rate-distortion curves and analyzing those curves to determine quantization parameters for encoding are described herein in the context of an encoder that performs a wavelet transform on pixel blocks prior to encoding, the methods as described herein may be adapted for use in any system that does video or image encoding in which quantization parameters for encoding need to be estimated.

While embodiments are generally described in reference to a two-level wavelet transform that decomposes blocks of data into seven subbands, embodiments of the methods described herein may be applied to n-level wavelet transforms that decompose blocks into 3n+1 subbands.

BRIEF DESCRIPTION OF THE DRAWINGS

FIG. 11 illustrates 5×5 masks that may be used in estimating distortion for the subblocks representing subbands generated by a biorthogonal wavelet transform, according to some embodiments.

FIG. 12 illustrates low-complexity masks that may be used in estimating distortion for the subblocks representing subbands generated by a biorthogonal wavelet transform, according to some embodiments.

Figure 1:
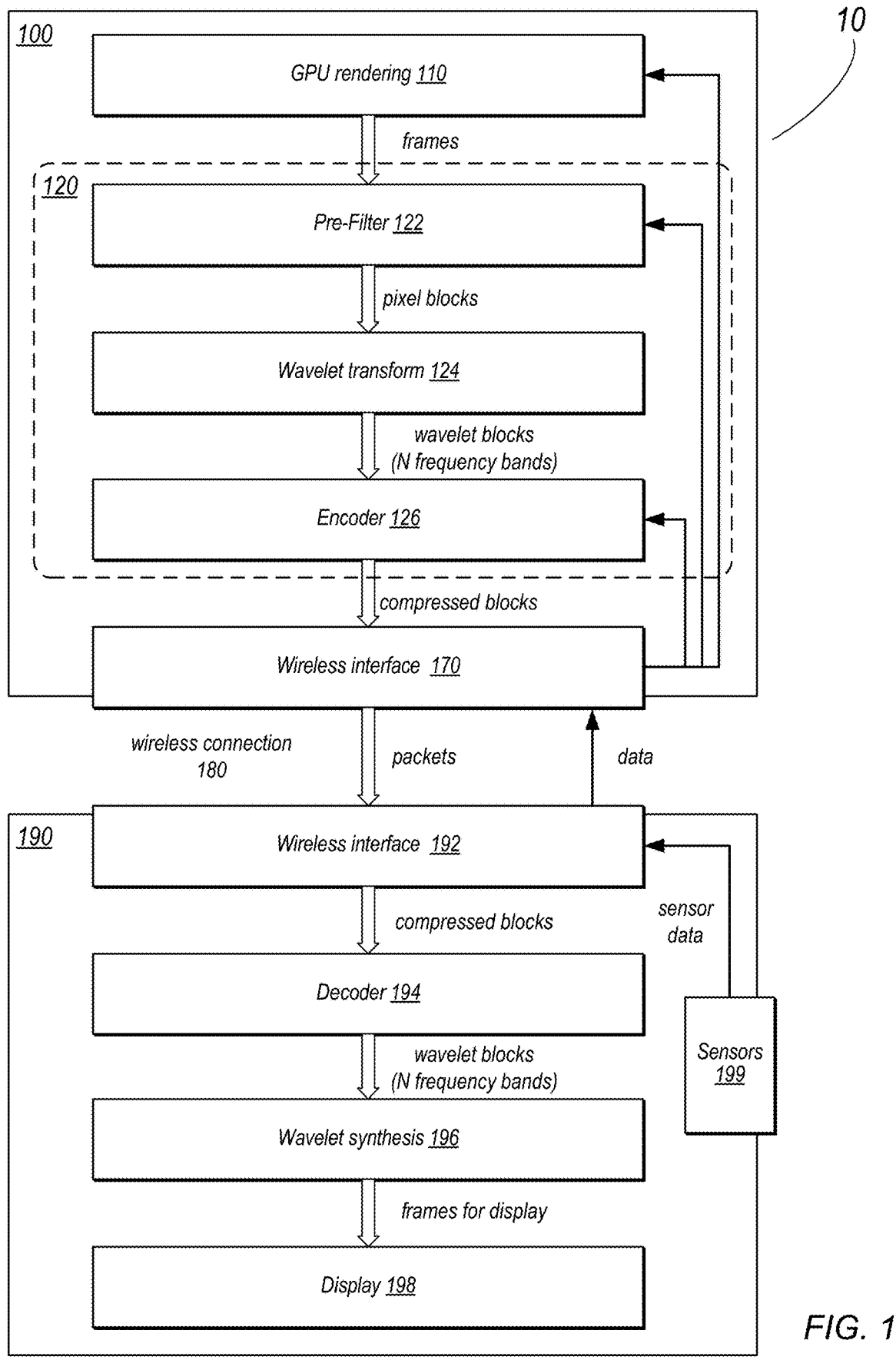
FIG. 1 is a block diagram illustrating a video encoding and decoding system, according to at least some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of a video encoding system are described. Embodiments of the video encoding system may encode high-resolution video sources at low latencies for transmission over a communications link (e.g., a wireless link) to a device for decoding and display. Embodiments of the video encoding system may also provide graceful degradation of encoded video transmitted to the device to maintain a desired frame rate in varying conditions such as variations in the channel capacity of the communications link.

An example application of the video encoding system is in virtual or mixed reality systems in which video frames containing virtual content are rendered, encoded, and transmitted to a device for decoding and display. Embodiments of a virtual or mixed reality system (referred to herein as a VR/MR system) are described in which embodiments of the video encoding system may be implemented. In some embodiments, the VR/MR system may include a device (e.g., a pad or tablet device, a smartphone, or a headset, helmet, goggles, or glasses worn by the user, referred to herein as a head-mounted device (HMD)), and a separate computing device, referred to herein as a base station. In some embodiments, the device and base station may each include wireless communications technology that allows the device and base station to communicate and exchange data via a wireless connection. In some embodiments, the device may include sensors that collect information about the user's environment (e.g., video, depth information, lighting information, etc.) and information about the user (e.g., the user's expressions, eye movement, hand gestures, etc.). The information collected by the sensors may be transmitted to the base station via the wireless connection. The base station may include software and hardware (e.g., processors (system on a chip (SOC), CPUs, image signal processors (ISPs), graphics processing units (GPUs), encoder/decoders (codecs), etc.), memory, etc.) configured to generate and render frames that include virtual content based at least in part on the sensor information received from the device via the wireless connection. The base station may also include an embodiment of the video encoding system as described herein that may pre-filter, compress and transmit the rendered frames to the device for display via the wireless connection.

Primary constraints to be considered on a wireless link include bandwidth and latency. A target of the VR/MR system is to provide a high resolution, wide field of view (FOV) virtual display to provide the user with a high-quality VR/MR view. Another target is to minimize latency between the time a frame is rendered by the base station and the time the frame is displayed by the device. However, the channel capacity of the wireless link may vary with time, and the wireless link may thus support only a certain amount of information to be transmitted at any given time.

Figure 3:
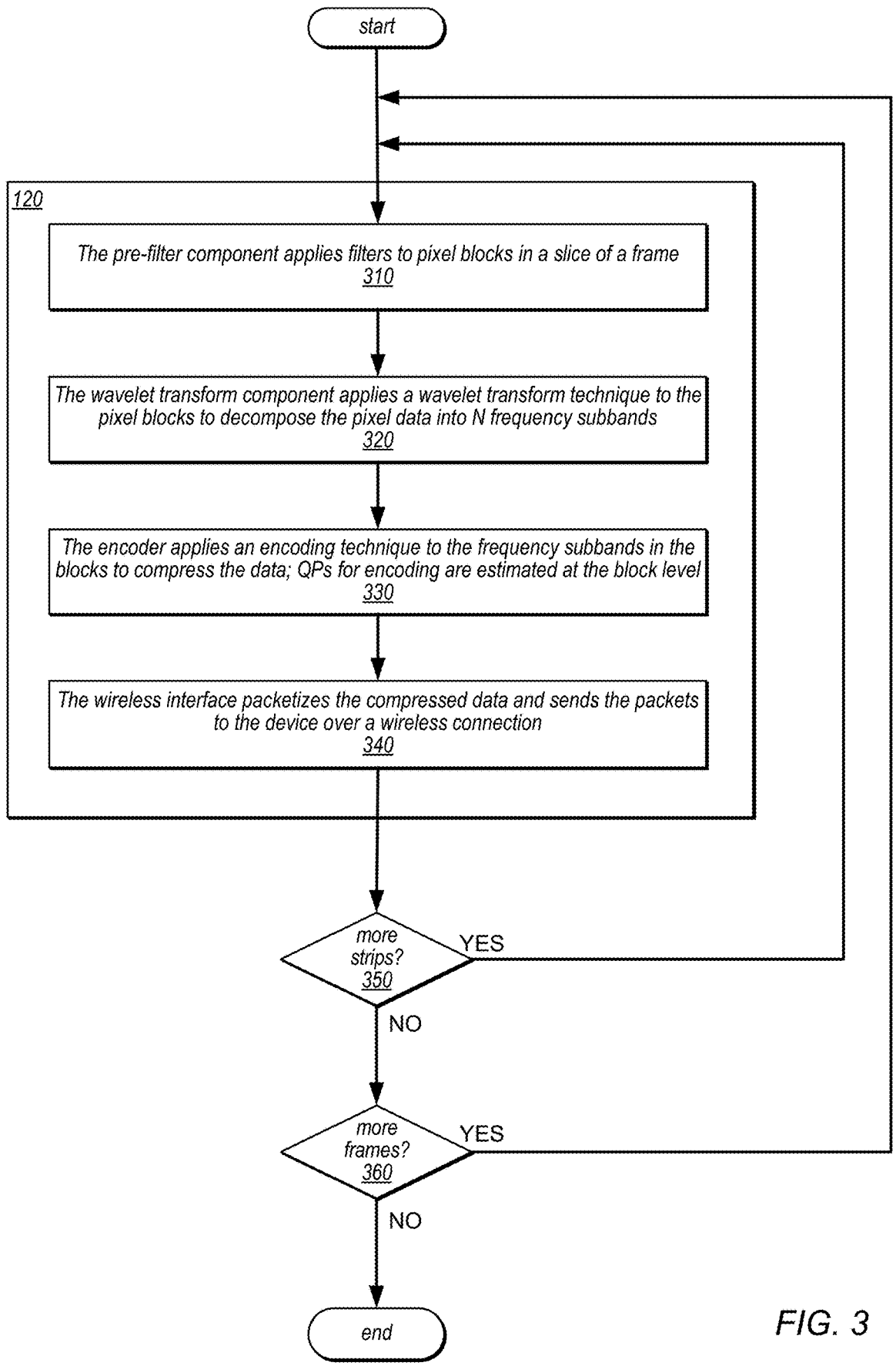
FIG. 3 is a flowchart of a method of operation for a video encoding system as illustrated in FIG. 1, according to at least some embodiments.

As shown at element 320 of FIG. 3, in some embodiments, the video encoding system may perform a wavelet transform on the pixel data prior to encoding to decompose the pixel data into subbands. The subbands are then organized into blocks that are provided to a block-based encoder for encoding/compression, as shown at element 330 of FIG. 3. As an example, a frame may be divided into 128×128 blocks, and a two-level wavelet decomposition may be applied to each 128×128 block to generate 16 32×32 blocks of frequency data representing seven subbands that may then be sent to an encoder (e.g., a High Efficiency Video Coding (HEVC) encoder) to be encoded. The encoded frequency data is then sent to a wireless interface that packetizes the encoded frequency data and transmits the packets to the receiving device (e.g., an HMD, pad or tablet device, smartphone, etc.), as shown at element 340 of FIG. 3. On the receiving device, the encoded data is de-packetized and passed through a block-based decoder to recover the subbands. Wavelet synthesis is then performed on the recovered subbands to reconstruct the pixel data for display.

Various block-based methods and apparatus are described herein that may be implemented by the video encoding system to maintain the target frame rate through the wireless link and to minimize the latency in frame rendering, transmittal, and display. In addition, the block-based methods and apparatus may provide graceful degradation of encoded video transmitted to the device to maintain a desired frame rate in varying conditions such as variations in the channel capacity of the communications link.

Image and video encoders may partition frames into blocks that are predicted, transformed and entropy coded as individual units. The bitrate of the resulting bitstream is the sum of the bitrates of the individual blocks. In conventional applications, the bitrate is controlled at relatively low granularity by estimating the rate and distortion of several aggregated blocks. This method works because the applications allow moderately high encoding latency and provide relatively large bitstream buffers. However, for wireless, virtual or augmented reality applications, latency is extremely low and bitstream buffers are small. Thus, rate control must respond quickly to wireless channel changes at a fine granularity.

Embodiments of a low-latency, block-based rate control method for VR/AR systems are described that estimates rate and distortion for video encoding accurately and efficiently at the block level. Conventional video encoders typically do not perform block-based rate control because most applications have moderately high encoding latency and provide relatively large bitstream buffers. In these conventional systems, rate control is performed at a frame level or strip level. However, for wireless, VR/AR systems, latency is extremely low and bitstream buffers are small. Embodiments may provide rate control in which target bitrates are met for every block without packet loss under varying wireless channel conditions.

Embodiments of an accurate, efficient, block-based rate-estimation method are described that may be employed in the low-latency, block-based rate control method described herein when generating rate-distortion curves from which quantization parameters for blocks are derived. Embodiments of the method may estimate the rate of a block to within 5% of the true rate.

Biorthogonal wavelet transforms may, for example be used for image/video compression and can also be added to systems that use non-wavelet compression to provide graceful degradation. In both applications, the wavelet coefficients are quantized to control the encoded bitrate. Increasing the quantization level decreases the bitrate but increases the distortion; conversely, decreasing the quantization level increases the bitrate but decreases the distortion. The distortion is usually measured as the Mean-Squared Error (MSE) of the reconstructed image. Because image reconstruction is expensive (time, hardware, software) at the encoder, the MSE associated with different quantization levels may be estimated. Embodiments of a masked estimator for biorthogonal wavelet transform MSE estimation are described that may employ 5×5 weight masks or simplified "low complexity" weight masks for estimating MSE in subbands; the masked estimator may provide a significant reduction in estimation error with minimal complexity increase (two or three multiplies, four additions) when compared to conventional methods that use single weights for estimating MSE in subbands. Embodiments of the masked estimator method for biorthogonal wavelet transform MSE estimation may, for example, be employed in the low-latency, block-based rate control method described herein when generating rate-distortion curves for subblocks (CTUs) of wavelet blocks from which quantization parameters for the wavelet blocks are derived. However, embodiments of the masked estimator method may also be used in any application to estimate MSE for biorthogonal wavelet transforms.

Example Video Encoding System

FIG. 1 is a block diagram illustrating an example video encoding system 120 that decomposes pixel data into subbands using a wavelet transform prior to encoding, according to at least some embodiments. A VR/MR system 10 may include at least one device 190 (e.g., a pad or tablet device, a smartphone, or an HMD such as a headset, helmet, goggles, or glasses that may be worn by a user) and a computing device 100 (referred to herein as a base station). The base station 100 renders VR or MR frames including virtual content, encodes the frames, and transmits the encoded frames over a wireless connection 180 to the device 190 for decoding and display by the device 190.

In some embodiments, the device 190 may include sensors 199 that collect information about the user's environment (e.g., video, depth information, lighting information, etc.) and about the user (e.g., the user's expressions, eye movement, gaze direction, hand gestures, etc.). The device 190 may transmit at least some of the information collected by sensors 199 to the base station 100 via wireless connection 180. The base station 100 may render frames for display by the device 190 that include virtual content based at least in part on the various information obtained from the sensors 199, encode the frames, and transmit the encoded frames to the device 190 for decoding and display to the user via the wireless connection 180.

The base station 100 and device 190 may implement wireless communications technology that allows the base station 100 and device 190 to communicate and exchange data via a wireless connection 180. Primary constraints to be considered on the wireless connection 180 between the device 190 and the base station 100 in a VR/MR system 10 include bandwidth and latency. For example, in some embodiments, a target is to provide a high resolution, wide field of view (FOV) virtual display to the user at a frame rate that provides the user with a high-quality VR/MR view. Another target is to minimize latency between the time a video frame is captured by the device and the time a rendered VR/MR frame based on the video frame is displayed by the device.

The base station 100 may include various hardware components for rendering, filtering, encoding, and transmitting video and/or images as described herein, for example various types of processors, integrated circuits (ICs), central processing units (CPUs), graphics processing units (GPUs), image signal processors (ISPs), encoder/decoders (codecs), etc. The base station 100 may include, but is not limited to, a GPU rendering 110 component, a wireless interface 130 component, and a video encoding system 120 that may include one or more hardware components that implement various methods that may help to maintain the target frame rate through the wireless connection 180 and to minimize the latency in frame rendering, encoding, transmittal, and display. The video encoding system 120 may include, but is not limited to, a pre-filter 122 component (e.g., an N-channel filter bank), a wavelet transform 124 component, and an encoder 126 component.

GPU rendering 110 may include one or more hardware components that may render frames for display by the device 190 that include virtual content based at least in part on the various information obtained from the sensors 199.

In some embodiments, the video encoding system 120 may include one or more hardware components that pre-filter 122 the pixel data in the rendered frames prior to performing a wavelet transform 124. Pre-filter 122 may, for example, reduce the resolution of the frames rendered on the base station 100 prior to performing the wavelet transform 124, encoding 126, and transmission to the device 190 over the wireless connection 180, which may help in improving compression, and may reduce latency and bandwidth usage on the wireless connection 180.

Figure 4:
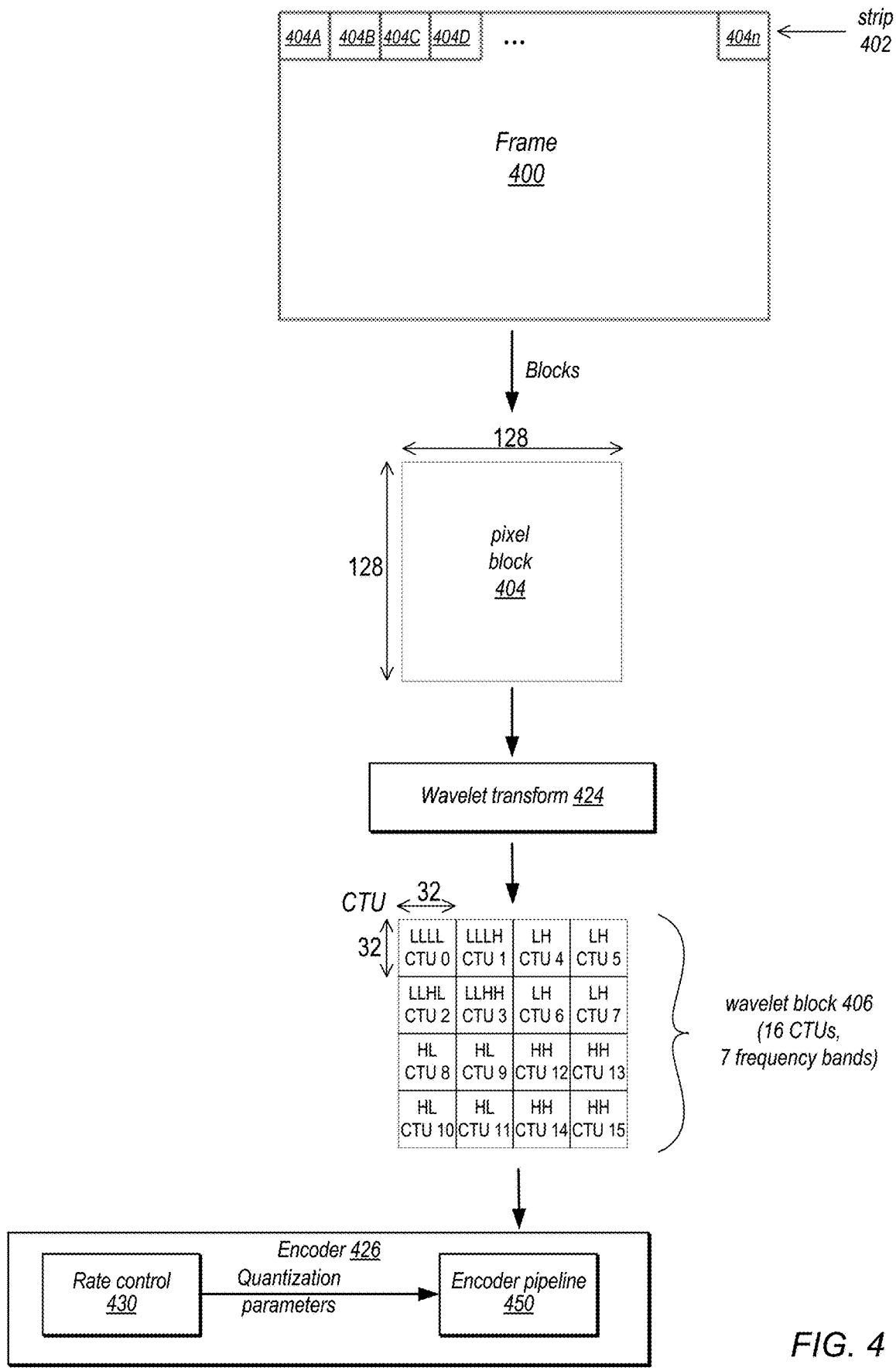
FIG. 4 illustrates performing a wavelet transform of a pixel block that stores pixel data to generate a wavelet block including subband data prior to encoding, according to at least some embodiments.

In some embodiments, a wavelet transform 124 component of the video encoding system 120 may include one or more hardware components (e.g., an N-channel filter bank) that perform a wavelet transform on the pixel data prior to encoding to decompose the pixel data into subbands. The subbands are then organized into blocks that are provided to a block-based encoder 126 for encoding/compression. As an example, as illustrated in FIG. 4, a frame may be divided into 128×128 blocks, and a two-level wavelet decomposition may be applied to each 128×128 block to generate 16 32×32 blocks of frequency data (referred to as coding tree blocks (CTUs)) representing seven subbands that may then be sent to a block-based encoder (e.g., a High Efficiency Video Coding (HEVC) encoder) 126 to be encoded. The encoded frequency data is then sent to a wireless interface 130, implemented by one or more hardware components, that packetizes the data and transmits the packets to the device 190 over a wireless connection 180.

The device 190 may include various hardware components for decoding and displaying video and/or images as described herein, for example various types of processors, integrated circuits (ICs), central processing units (CPUs), graphics processing units (GPUs), image signal processors (ISPs), encoder/decoders (codecs), etc. The device 190 may include, but is not limited to, a wireless interface 192, a decoder 194 component (e.g., High Efficiency Video Coding (HEVC) decoder), a wavelet synthesis 196 component, and a display 198 component. On the device 190, the wireless interface 192 receives the packets that were transmitted over the wireless connection 180 by the base station 100. The encoded data is de-packetized and passed through a block-based decoder 194 (e.g., a High Efficiency Video Coding (HEVC) decoder) to recover the subbands. Wavelet synthesis 196 is then performed on the recovered frequency data to reconstruct the pixel data for display 198.

Figure 2:
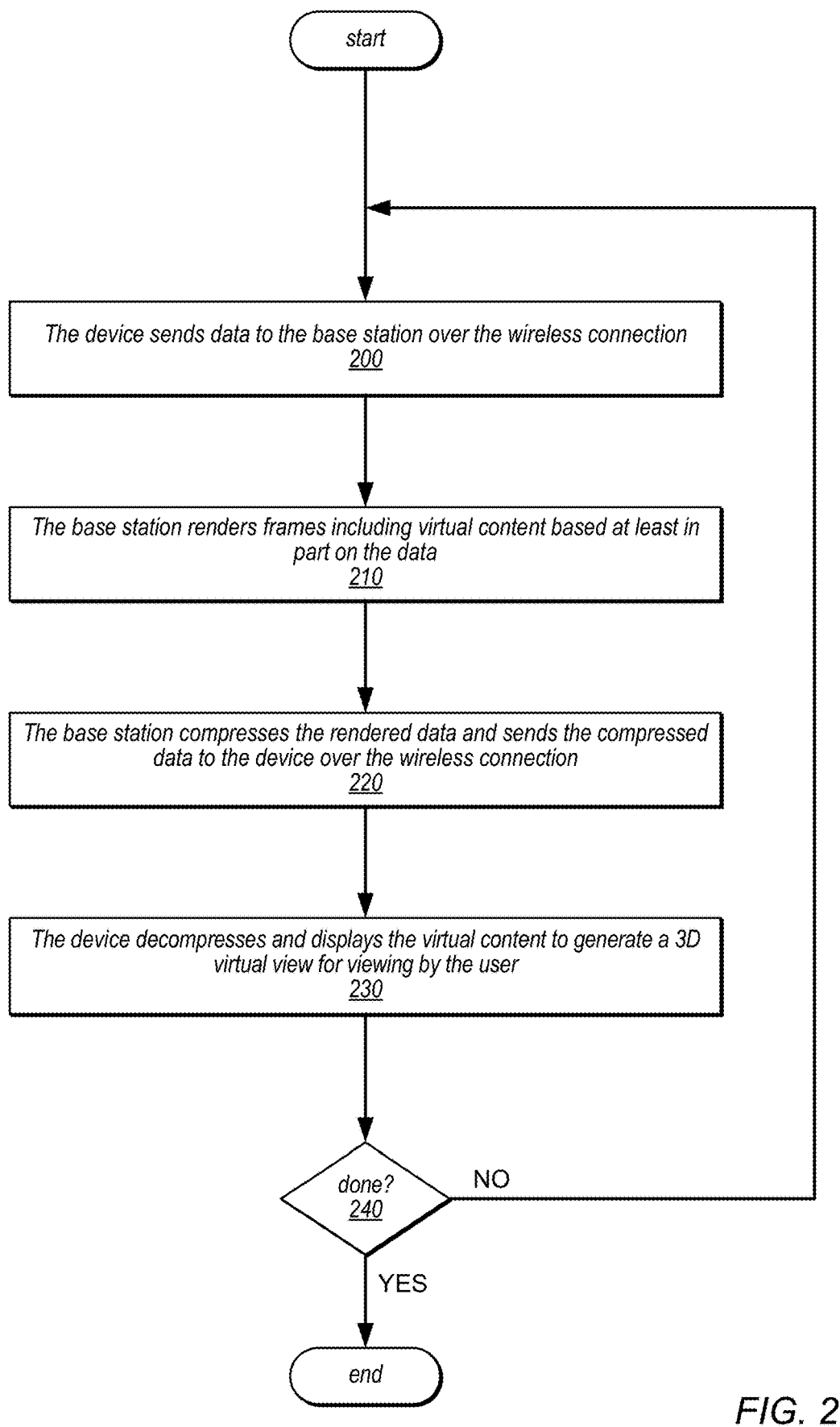
FIG. 2 is a high-level flowchart of a method of operation for VR/MR systems that include video encoding and decoding systems as illustrated in FIG. 1, according to at least some embodiments.

FIG. 2 is a high-level flowchart of a method of operation for VR/MR systems that include video encoding systems as illustrated in FIG. 1, according to at least some embodiments. As indicated at 200, the device sends data to the base station over the wireless connection. As indicated at 210, the base station renders frames including virtual content based at least in part on the device data. As indicated at 220, an encoding component on the base station compresses the rendered data and sends the compressed data to the device over the wireless connection. As indicated at 230, the device decompresses and displays the virtual content to generate a 3D virtual view for viewing by the user. As indicated by the arrow returning from 240 to 200, the method continues as long as the user is using the VR/MR system.

In some embodiments, rather than rendering and encoding entire frames in the base station and transmitting the rendered frames to the device, the base station may render and encode parts of frames (referred to as strips) and transmit the encoded strips to the device as they are ready. A strip may, for example, be a row of 128×128 pixel blocks.

Conventionally, a rate control component of the encoding component estimates quantization parameters (QPs) at the strip or frame level. Embodiments of a block-based, low latency video rate control method are described that estimate QPs for each block in a strip. Thus, embodiments may determine QPs for encoding blocks at the block level, rather than at the strip or frame level.

FIG. 3 is a flowchart of a method of operation for a video encoding system as illustrated in FIG. 1, according to at least some embodiments. The method of FIG. 3 may, for example, be performed at element 120 of FIG. 1. The method of FIG. 3 assumes strip-based encoding and transmission is being performed.

As indicated at 310, the pre-filter component applies filters to pixel blocks in a strip of the frame. In some embodiments, pre-filtering may include performing a lens warp on the frames on the base station prior to the wavelet transform. The lens warp is performed to correct for the distortion of the images introduced by the lenses on the device that the images are viewed through, thus improving quality of the images. In some embodiments, the device may store lens warp data for the lenses, for example generated by a calibration process, and may provide the lens warp data to the base station over the wireless connection. The base station may then perform the lens warp on the frames based on the lens warp data for that device. Performing the lens warp on the base station in the pre-filter stage may reduce the resolution of the frames prior to performing the wavelet transform and encoding, which may help in improving compression, and may reduce latency and bandwidth usage on the wireless link. In addition, by performing the lens warp on the base station in the pre-filter stage rather than on the device after decoding, filtering of the image data may only need to be performed once, as opposed to performing filtering on the base station to reduce resolution prior to encoding and then performing lens warp filtering on the device.

In some embodiments, pre-filtering at 310 may also include filtering to reduce resolution in peripheral regions while maintaining higher resolution in foveated regions. In some embodiments, gaze tracking information obtained from the device may be used to identify the direction in which the user is currently looking. A region of the frame that corresponds to the fovea (referred to as the foveated region) may be identified based at least in part on the determined gaze direction. The peripheral region (i.e. the portion of the frame outside the foveated region) may be pre-filtered to reduce information based on knowledge of the human vision system, for example by filtering high frequency information and/or increasing color compression. Pre-filtering of the peripheral region may help to provide improved compression of the frame.

As indicated at 320, the wavelet transform component applies a wavelet transform technique to the pixel blocks to decompose the pixel data into N (e.g., 7) subbands. The subbands are organized into subblocks (e.g., coding tree units CTUs)) in wavelet blocks; the subblocks are provided to a block-based encoder for encoding/compression. As an example, a frame may be divided into 128×128 pixel blocks, and a two-level wavelet decomposition may be applied to each 128×128 pixel block to generate a wavelet block including 16 32×32 subblocks of frequency data representing seven subbands, for example as illustrated in FIG. 4, and the 16 subblocks may then be encoded by the encoder.

As indicated at 330, the encoder applies an encoding technique to the subblocks of the wavelet blocks to compress the data. The encoder may, for example, be a High Efficiency Video Coding (HEVC) encoder. However, other encoding techniques may be used in some embodiments. A rate control component of the encoder estimates quantization parameters (QPs) for the 16 subblocks (CTUs) in each wavelet block and passes the QPs to an encoder pipeline component of the encoder that encodes the CTUs according to the respective QPs. Thus, embodiments determine QPs for encoding at the block level, rather than at the strip or frame level. Embodiments of methods for efficiently determining the QPs for the 16 CTUs in a wavelet block is described herein.

As indicated at 340, the wireless interface packetizes the compressed data and sends the packets to the device over a wireless connection.

At 350, if there are more strips in the current frame to be encoded and transmitted, the method returns to element 310 to process the next strip. Otherwise, at 360, if there are more frames to be encoded and transmitted, the method returns to element 310 to begin processing the strips of the next frame.

FIG. 4 illustrates performing a wavelet transform of a pixel block that stores pixel data to generate subband data prior to encoding, according to at least some embodiments. The video encoding system may compress 128×128 pixel blocks 404 from strips 402 in a frame 400. In this example, a two-level wavelet decomposition is applied by the wavelet transform 424 component to each 128×128 pixel block 404 to generate a 128×128 wavelet block 406 including sixteen 32×32 subblocks of frequency data representing seven subbands. These subblocks (CTUs) are then provided to an encoder 426 for encoding. For example, the CTUs may be written to a buffer by the wavelet transform 424 component, and read from the buffer by an encoder pipeline 450 component of the encoder 426. A rate control component 430 of the encoder estimates quantization parameters (QPs) for the 16 CTUs in each wavelet block 406 and passes the QPs to the encoder pipeline 450. Thus, embodiments determine QPs for encoding wavelet blocks 406 at the block level, rather than at the strip or frame level. Embodiments of methods for efficiently determining the QPs for the 16 CTUs in a wavelet block 406 is described herein.

In the labels of the CTUs, the letter L represents a low pass filter, and the letter H represents a high pass filter. The CTUs labeled with two letters represent a one-level (2D) wavelet transform or decomposition. In the CTUs labeled with two letters (representing three of the seven subbands LH, HL, and HH), the first letter represents a vertical filter (either high or low) performed first, and the second letter represents a horizontal filter (either high or low) performed second. The CTUs labeled with four letters represent a two-level wavelet transform or decomposition. In the CTUs labeled with four letters, the first two letters (LL) indicate that there was first a vertical low pass filter followed by a horizontal low pass filter; the second two letters indicate that the resulting LL block was then filtered four ways, LL, LH, HL, and HH (thus generating four of the seven subbands (LLLL, LLLH, LLHL, and LLHH).

In the labels of the CTUs, the numbers (CTU 0, CTU 1, CTU 15) represent an example order of processing of the CTUs by the encoder pipeline 450. Note, however, that other orders of processing may be used in some embodiments.

In some embodiments, decomposing the pixel data into subbands as illustrated in FIG. 4 allows the subbands to be buffered and processed as separate streams by the encoder pipeline 450. Processing the subbands as separate streams allows the encoder pipeline 450 to multiplex the processing of the independent streams. In block-based encoding methods such as HEVC encoding, blocks (referred to as coding tree units (CTUs)) are processed in a block processing pipeline at multiple stages; two or more CTUs may be at different stages of the pipeline at a given clock cycle, and the CTUs move through the pipeline as the clock cycles. The processing of a given CTU may have dependencies on one or more previously processed neighbor blocks, for example one or more CTUs in the row above the given CTU and/or the CTU to the left of the given CTU. By multiplexing the processing of the streams of subband data, the encoder 426 spaces out the processing of the CTUs in a given stream, thus providing additional clock cycles to process a neighbor CTU on which a given CTU has dependencies. For example, the CTU to the left of the given CTU may be several stages ahead of the given CTU in the encoding pipeline when the given CTU reaches a stage that depends on the previously processed neighbor CTU. This allows the encoder pipeline 450 to better handle dependencies on previously processed CTUs, and reduces or eliminates the need to wait for completion of processing of a neighbor CTU in the pipeline before processing the given CTU at a stage that depends on the neighbor CTU.

In addition, decomposing the pixel data into subbands as illustrated in FIG. 4 may allow the subbands to be prioritized by the encoder 426 and the wireless interface. Typically, in image and video transmission, the lower frequencies are more important, while the higher frequencies are less important. Higher frequencies usually correspond to details in the image, and thus can be considered as lower priority. The higher subbands contain a smaller percentage of the energy in the image. Most of the energy is contained in the lower subbands. Decomposing the pixel data into subbands thus provides a priority ordering to the data stream that can be leveraged by the encoder 426 and the wireless interface when encoding and transmitting the data stream. For example, in some embodiments, different compression techniques may be used on the different subbands, with more aggressive compression applied to the lower priority bands, and more conservative compression applied to the higher priority bands. As another example, the priority ordering of the subbands may help in providing graceful degradation of the VR/MR system. Performance of the wireless connection can be monitored, and feedback from the device may be considered, to track performance of the overall system. If the system is falling behind for some reason, for example if the wireless connection degrades and bandwidth capacity of the wireless connection drops below a threshold, the encoder 426 and wireless interface may prioritize the encoding and transmission of one or more of the lower subbands, and may reduce or drop the encoding and/or transmission of one or more of the frequency levels that have been assigned a lower priority level, for example one or more of the higher subbands.

As described above, the wavelet transform decomposes an image into subbands. In some embodiments, this may be leveraged to send the same signal to displays of varying resolution. As an example, suppose that a two-level wavelet decomposition is applied to decompose the signal into seven bands. If four of the bands are sent (LLLL, LLLH, LLHL and LLHH), the bands may be reconstructed to the original intended resolution at less visual quality. As an alternative, the bands may also be reconstructed at ¼th resolution (½ in each dimension) which may be suitable for a display panel with smaller display resolution.

While embodiments are generally described in reference to a two-level wavelet transform that decomposes blocks of data into seven subbands, embodiments of the methods described herein may be applied to n-level wavelet transforms that decompose blocks into 3n+1 subbands.

Block-Based, Low Latency Rate Control

An encoder may employ a rate control method or algorithm to dynamically adjust encoder parameters to achieve a target bitrate. A rate control method may estimate video bitrate based on the available bandwidth of the wireless connection. The estimated bitrate may be used to adjust the encoder parameters to ensure that the coded bit stream can be transmitted successfully while optimizing usage of the available bandwidth. Typically, rate control methods for video streaming systems work over a time constant of a strip, frame or two frames to estimate video bitrate and adjust encoder parameters accordingly.

A target of a VR/MR system that implements an embodiment of the video encoding system as described herein may be to provide very low latency between the time the virtual content is rendered on the base station and the time the virtual content is displayed on the device while minimizing errors (e.g., dropped packets) and maximizing bandwidth usage over the wireless connection. Another constraint on VR/MR systems is memory. The targeted low latency and memory constraint for the system is a challenge for rate control in the encoder when encoding data to be transmitted over the wireless connection to the device.

In some embodiments, the video encoding system includes a wavelet transform component that performs a 2-layer wavelet decomposition that decomposes blocks of pixels (e.g., 128×128 blocks) from a strip of a frame into multiple (e.g., seven) different subbands represented in subblocks (e.g., 16 32×32 CTUs) of a wavelet block, followed by a block-based encoder such as HEVC that encodes the subbands. In some embodiments, to perform rate control under the strict latency requirements and memory constraints of the VR/MR system, instead of working over a time constant of a strip, frame or two frames to adjust encoder parameters, a rate control component may estimate or adjust encoder parameters for each wavelet block (e.g., the quantization parameters for the 16 CTUs in the wavelet block).

In some embodiments, complexity statistics may be calculated for the CTUs in a wavelet block, for example by a complexity analysis component of the video encoding system. The complexity statistics may then be used by the rate control component to adjust the quantization parameters for the CTUs in the wavelet block.

In some embodiments, the rate control component may store rate control statistics for one or more previously processed frames. Stored statistics for co-located blocks (e.g., quantization parameters for the CTUs in the blocks) may be used by the rate control component in determining quantization parameters for a current block being processed in the video encoding system. In some embodiments, complexity statistics for the current block may be determined and used by the rate control component to adjust the quantization parameters from a co-located block to generate the quantization parameters for the current block.

In embodiments of a rate control component as described herein, the quantization parameters for the CTUs in a block may be calculated globally to jointly optimize bandwidth usage and the overall displayed quality of the video data after decoder reconstruction and wavelet synthesis is performed on the target device. Embodiments of the rate control component may implement a method for rate allocation between the CTUs in a block that estimates quantization parameters (QPs) for the CTUs in a block (e.g., QPs for the 16 CTUs in a wavelet block (WB)) to minimize wavelet-inverse distortion given a rate bound for the wavelet block:

$$\min_{QP_0,\dots QP_{15}} \|W^{-1}(WB) - W^{-1}H^{-1}H(WB)\|_2^2, \quad (1)$$

$$\text{subject to} \sum_{n=0}^{15} R_n \leq R_{wbTarget}$$

where $W^{-1}$ is the inverse wavelet transform, H is the HEVC encoding of $CTU_n$ with $QP_n$ for $0\!<\!=\!n\!<\!=\!15$, $H^{-1}$ is the HEVC decoding of encoded $CTU_n$ for $0\!<\!=\!n\!<\!=\!15$, $R_n$ is the number of bits required to HEVC-encode $CTU_n$ with $QP_n$, and $R_{wbTarget}$ is the target rate for the wavelet block.

Embodiments of the rate control component may implement a method to estimate the global minimizing QPs for a wavelet block in which, for each CTU in the wavelet block, a curve is generated (referred to as a rate-distortion curve) that maps the distortion and the number of bits (rate) for that CTU. A given point on a rate-distortion curve indicates distortion at a given bit rate for the corresponding CTU. Once the rate-distortion curves for the 16 CTUs are generated, the rate control component finds a point on each curve where the slope is the same for all the rate-distortion curves. The QPs associated with those equally sloped points are the 16 global minimizing QPs for the current wavelet block.

To generate the rate-distortion curves for the 16 CTUs, a rate curve and a distortion curve needs to be determined for each CTU. The encoder provides encoding statistics for each CTU to the rate control component, the encoding statistics including a discrete cosine transform (DCT) histogram (a histogram of unquantized DCT coefficients for the CTU), bit count statistics, and a distortion estimate. A key observation is that all of the quantized histograms can be derived from the unquantized histogram. Thus, the unquantized DCT histogram can be used to extrapolate the rate-distortion curves for a respective CTU at any QP. The rate-distortion curves for the 16 CTUs of a wavelet block in a current frame may be stored to a memory and used to estimate the QPs for a co-located wavelet block in a next frame. Complexity metrics determined for a current wavelet block may be used to correct the stored statistics from the co-located wavelet block of a previous frame.

Embodiments of a method for determining the rate curves for the CTUs are described. The histogram of unquantized DCT coefficients for a CTU is represented as a power-of-two bin structure that stores the absolute value of the coefficients. The power-of-two bin structure allows relatively simple rate and distortion estimates to be performed in hardware by the rate control component. The bit count statistics are also stored. When estimating the QPs for a wavelet block in a current frame, the rate curves for the CTUs may be estimated from the respective DCT histograms and bit count statistics stored by the encoder.

Embodiments of a method for determining the distortion curves for the CTUs when using a biorthogonal wavelet transform to generate the subbands are also described. Embodiments may implement a method for efficient, accurate, estimation of mean-squared error (MSE) in biorthogonal, wavelet transforms. The encoder pipeline encodes one CTU (also referred to as a subblock) at a time, and provides a distortion estimate for that subblock to the rate control component. However, the distortion that is of interest is the distortion after decoding and wavelet synthesis is performed on the entire encoded block (all 16 subblocks) at the target device. Thus, a challenge is to estimate the contribution of the distortion in one subblock (CTU) to the distortion at the target device which comes from the wavelet synthesis of all 16 decoded CTUs. Embodiments of a masked estimator are described that can be applied to each CTU to estimate the MSE for the CTU (i.e., the distortion of the wavelet inverse of a biorthogonal subband). The masked estimator may implement a 5×5 weight mask for each subband generated by the biorthogonal wavelet transform. The 5×5 masks weight the errors and their correlations. Within a subband, the ×5 mask computes intra-subband error energy, and thus includes intra-subband correlations in the distortion estimate. The distortion estimates (MSEs) for the 16 subblocks may then be used to estimate the distortion curves for the respective wavelet block.

In some embodiments, the 5×5 masks may be simplified using thresholding to generate low-complexity weight masks; the masked estimator can then apply these low-complexity masks to each subblock to generate distortion estimates for the subblocks. The low-complexity masks approximate the 5×5 masks with only five non-zero weights at the center, above center, below center, left of center, and right of center. For the LLLL, LLHH and HH subbands, the low-complexity masks require only two multiplies and four additions. For the LLLH, LLHL, HL and LH subbands, the low-complexity masks require only three multiplies and four additions. Within a subband, the low-complexity mask computes intra-subband error energy, and thus includes intra-subband correlations in the distortion estimate. The distortion estimates (MSEs) for the 16 CTUs may then be used to estimate the distortion curves for the respective wavelet block.

Figure 5:
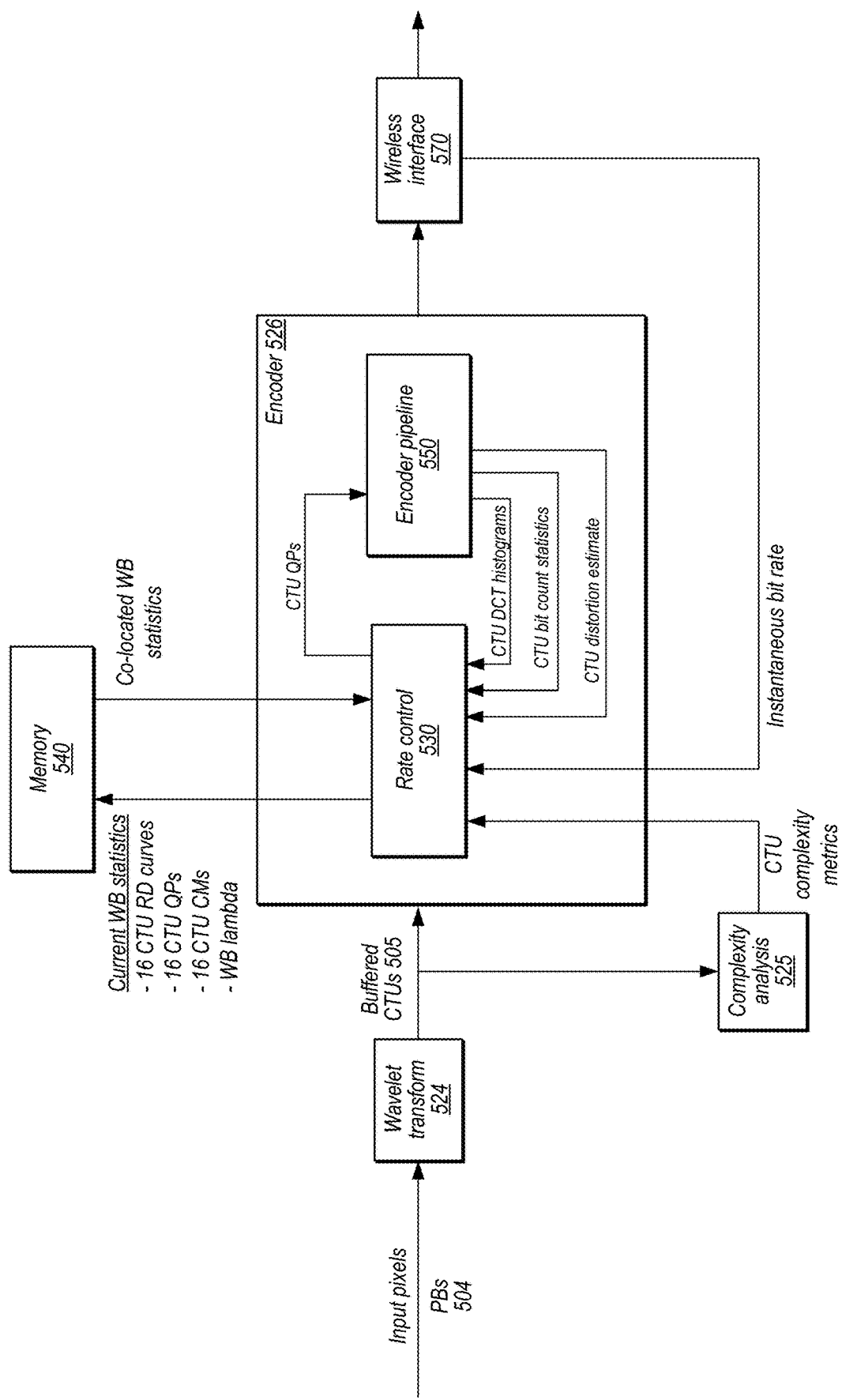
FIG. 5 is a block diagram illustrating rate control in a video encoding system, according to at least some embodiments.

FIG. 5 is a block diagram illustrating rate control in a video encoding system, according to at least some embodiments. In some embodiments, pixel blocks (PBs 504) from rendered strips of a frame that include pixel data may be first processed by a pre-filter component (not shown). The output of the pre-filter is processed by a wavelet transform 524 component. In some embodiments, the wavelet transform 524 component performs a 2-layer wavelet decomposition that decomposes blocks of pixels (e.g., 128×128 blocks) from a strip of a frame into multiple (e.g., seven) different subbands represented in 16 CTUs, as shown in FIG. 4.

In some embodiments, the wavelet blocks including CTUs representing the subbands for a strip of pixel blocks 504 may be buffered 505 after the wavelet transform 524 so that CTU complexity metrics (CMs) may be calculated across the subbands for the wavelet blocks in the strip by a complexity analysis 525 component of the video encoding system prior to encoding. In some embodiments, for each CTU, the complexity metric is an N-bit estimate of the entropy of that CTU. The complexity analysis 525 component provides the CMs for the CTUs in each wavelet block of the strip to the rate control 524 component of the encoder 526. In some embodiments, the rate control 530 component receives the CMs for all CTUs in a strip before the encoder pipeline 550 begins to encode the strip.

In some embodiments, the quantization parameters for the CTUs in a wavelet block may be calculated by the rate control 530 component jointly to allocate the rate between the subbands while optimizing the overall displayed quality (i.e., minimizing distortion) of the blocks after decoder reconstruction and wavelet synthesis is performed on a target device. The rate control 530 component may, for example, use the CMs for a wavelet block in combination with rate control statistics from a co-located wavelet block from a previous frame accessed from memory 540 and wireless bit rate information from wireless interface 570 to estimate quantization parameters for the CTUs in a wavelet block (WB) of the current frame. In some embodiments, the stored statistics for a co-located wavelet block may include rate-distortion (RD) curves for the CTUs in the wavelet block, quantization parameters (QPs) for the CTUs, complexity metrics (CMs) for the CTUs, and a lambda value for the wavelet block (WB lambda) determined from the RD curves. The WB lambda is the "equal-lambda point" or "equal slope point" on the CTU RD curves determined by the rate control 530 component; the WB lambda indicates or corresponds to the optimal CTU QPs for the wavelet block.

Rate control statistics for the current wavelet block may be stored to memory 540. In some embodiments, the stored statistics for a current wavelet block may include RD curves for the CTUs in the wavelet block, QPs for the CTUs, CMs for the CTUs, and the WB lambda for the wavelet block.

The rate control 530 component provides the estimated quantization parameters for the CTUs in the current wavelet block to the encoder pipeline 550, which uses the quantization parameters to encode the CTUs of the wavelet block. The encoded CTUs are provided to the wireless interface 570, which packetizes and transmits the encoded CTUs representing the subbands over a wireless connection 580 to a target device. Encoding statistics for the current wavelet block are passed back to the rate control 530 component by the encoder pipeline 550. The encoder pipeline 550 provides encoding statistics for each CTU in the wavelet block to the rate control 530 component. In some embodiments, the encoding statistics may include a discrete cosine transform (DCT) histogram (a histogram of unquantized DCT coefficients for the CTU), CTU bit count statistics, and a CTU distortion estimate. The rate control 530 component may use the encoding statistics for the current wavelet block in generating the WB statistics for the current wavelet block, which are then stored to memory 540.

A goal of the video encoding system is to optimize quality of the video stream to the device while maximizing bandwidth usage and minimizing latency over the wireless connection 580 to the device. In some embodiments, to help achieve this goal, the wireless interface 570 may provide current wireless connection information as feedback to the rate control 530 component of the encoder 526. The rate control 530 component may use this information in determining quantization parameters for the CTUs in the wavelet blocks. In some embodiments, the wireless interface 570 may track the instantaneous bit rate of the wireless connection 580, and feeds the current bit rate back to the rate control 530 component. The rate control 530 component then uses this instantaneous bit rate as a constraint when estimating the QPs for wavelet blocks. In some embodiments, before encoding a strip, the rate control 530 component uses the instantaneous bit rate to determine $R_{stripTarget}$, the target number of bits for all wavelet blocks contained in the strip. $R_{stripTarget}$ may be allocated proportionally to each wavelet block. In some embodiments, more bits may be allocated from $R_{stripTarget}$ to wavelet blocks that contain CTUs with larger complexity metrics, while fewer bits may be allocated to wavelet blocks that contain CTUs with smaller complexity metrics. The number of bits allocated to a wavelet block may be referred to as a rate bound for the wavelet block.

Figure 6:
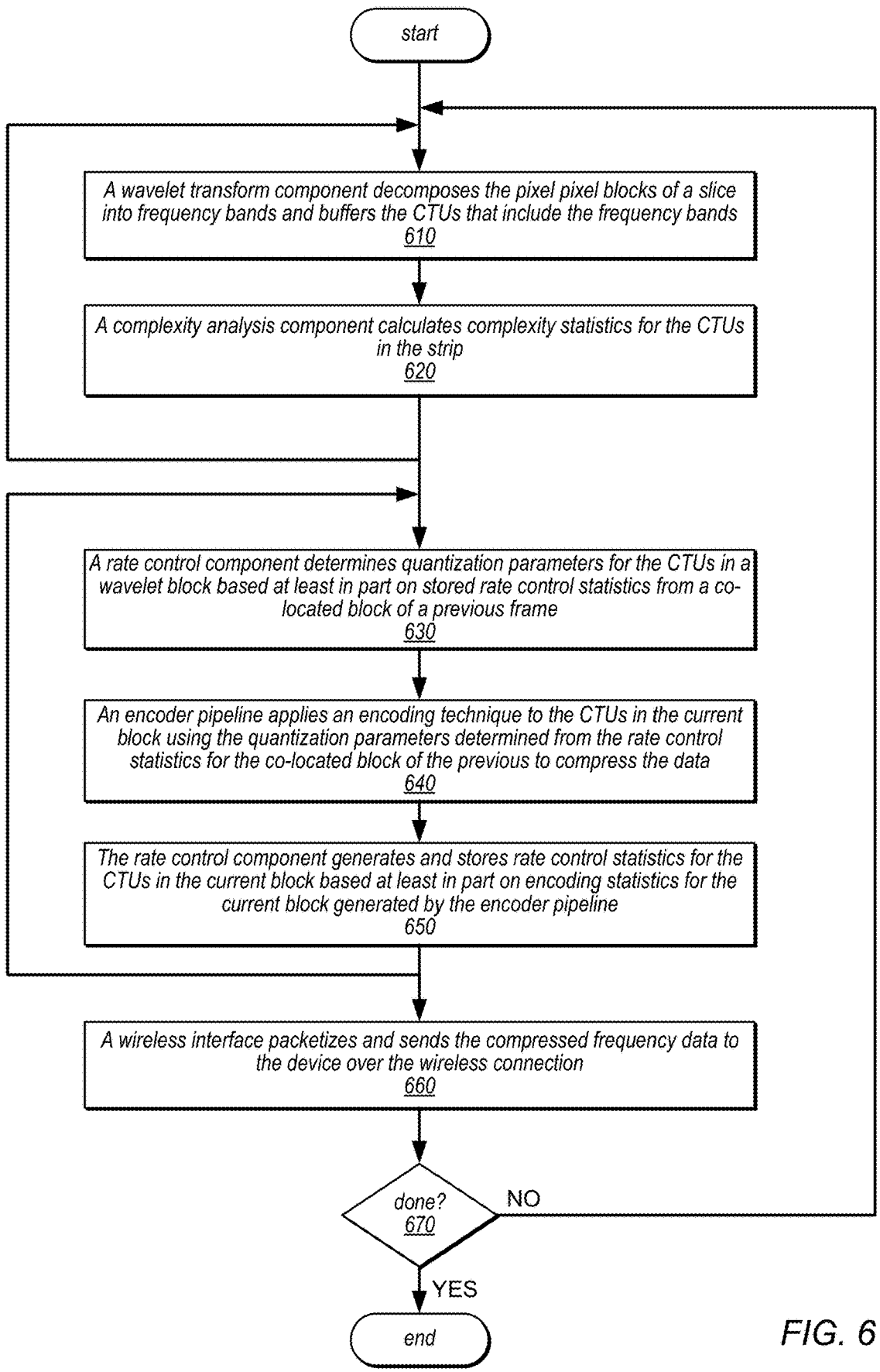
FIG. 6 is a flowchart of a method of operation for a video encoding system as illustrated in FIG. 5, according to at least some embodiments.

FIG. 6 is a flowchart of a method of operation for a video encoding system as illustrated in FIG. 5, according to at least some embodiments. In some embodiments, the pixel blocks (e.g., 128×128 blocks) from a strip of a frame are first processed by a pre-filter component, for example an N-channel filter bank, as indicated at 600.

As indicated at 610, a wavelet transform component decomposes the pixel blocks (e.g., 128×128 blocks) from the strip into N (e.g., 7) subbands to generate wavelet blocks (e.g., 128×128 blocks containing 16 32×32 CTUs). In some embodiments, the wavelet transform component performs a 2-layer wavelet decomposition that decomposes blocks of pixels (e.g., 128×128 blocks) from a strip of a frame into multiple (e.g., seven) different subbands. In some embodiments, wavelet blocks (e.g., 128×128 blocks) including CTUs (e.g., 16 32×32 CTUs) representing the subbands for a strip of pixel blocks may be buffered after the wavelet transform so that complexity statistics may be calculated across the subbands for the strip by a complexity analysis component of the video encoding system prior to encoding.

As indicated at 620, a complexity analysis component calculates complexity statistics for the CTUs in a strip. In some embodiments, for each CTU, the complexity metric is an N-bit estimate of the entropy of that CTU. The complexity analysis component provides the CM for the CTUs in each wavelet block of the strip to the rate control component of the encoder. In some embodiments, the rate control component receives the CMs for all CTUs in a strip before the encoder begins to encode the strip.

As indicated by the arrow returning from element 620 to element 610, elements 610 and 620 may be performed for each strip in a frame.

As indicated at 630, the rate control component of the encoder determines quantization parameters for the CTUs in a wavelet block based at least in part on stored rate control statistics from a co-located block of a previous frame. The rate control component may, for example, use the CMs for the current wavelet block in combination with stored rate control statistics for a co-located wavelet block from a previous frame accessed from memory and wireless bit rate information from wireless interface to estimate quantization parameters for the CTUs in the wavelet block of the current frame. In some embodiments, the stored statistics for a co-located wavelet block may include rate-distortion (RD) curves for the CTUs in the wavelet block, quantization parameters (QPs) for the CTUs, complexity metrics (CMs) for the CTUs, and a lambda value for the wavelet block (WB lambda) determined from the RD curves. The WB lambda is the "equal-lambda point" or "equal slope point" on the CTU RD curves determined by the rate control component; the WB lambda indicates or corresponds to the optimal CTU QPs for the wavelet block.

In some embodiments, the wireless interface may track the instantaneous total bit rate of the wireless connection, and feeds the current bit rate back to the rate control component, which uses the instantaneous bit rate as a constraint when estimating the QPs for wavelet blocks. In some embodiments, before encoding a strip, the rate control 530 component uses the instantaneous bit rate to determine $R_{stripTarget}$, the target number of bits for all wavelet blocks contained in the strip. $R_{stripTarget}$ may be allocated proportionally to each wavelet blocks. In some embodiments, more bits may be allocated from $R_{stripTarget}$ to wavelet blocks that contain CTUs with larger complexity metrics, while fewer bits may be allocated to wavelet blocks that contain CTUs with smaller complexity metrics. The number of bits allocated to a wavelet block may be referred to as a rate bound for the wavelet block.

The rate control component provides the quantization parameters for the CTUs in the current wavelet block that were determined from the stored rate control statistics for the co-located block in the previous frame to the encoder pipeline, for example as a vector including 16 QP values.

As indicated at 640, the encoder pipeline (e.g., an HEVC encoder pipeline) applies an encoding technique to the CTUs in the current wavelet block using the quantization parameters provided by the rate control component to compress the data. The rate control component provides the quantization parameters for the CTUs in the current wavelet block to the encoder pipeline of the encoder, which uses the quantization parameters to encode the CTUs in the wavelet block. The encoded CTUs are provided to the wireless interface of the base station. The encoder pipeline feeds back encoding statistics for each CTU in the wavelet block to the rate control component. In some embodiments, the encoding statistics may include a discrete cosine transform (DCT) histogram (a histogram of unquantized DCT coefficients for the CTU), CTU bit count statistics, and a CTU distortion estimate.

As indicated at 650, the rate control component may use the encoding statistics for the wavelet block received from the encoding pipeline to generate WB statistics for the wavelet block. In some embodiments, quantization parameters for the CTUs in the wavelet block may be calculated by the rate control component jointly to allocate the rate between the subbands while optimizing the overall displayed quality (i.e., minimizing distortion) of the blocks after decoder reconstruction and wavelet synthesis is performed on a target device. The rate control statistics for the wavelet block may be stored to memory by the rate control component. In some embodiments, the stored rate control statistics for a wavelet block may include RD curves for the CTUs in the wavelet block, QPs for the CTUs, CMs for the CTUs, and a WB lambda for the wavelet block. The stored rate control statistics for the wavelet block may then be used to determine the QPs for the CTUs in a co-located block of a next frame.

As indicated by the arrow returning from element 650 to element 630, elements 630 through 650 may be performed for each block in a strip.

As indicated at 660, the wireless interface packetizes and sends the compressed data to the device over the wireless connection. In some embodiments, the wireless interface may provide current wireless connection information as feedback to the rate control component of the encoder. The rate control component may use this information in determining rate bounds and quantization parameters for the subblocks (CTUs) of wavelet blocks.

As indicated by the arrow returning from element 670 to element 610, the method may continue as long as there is data to be transmitted to the device.

Figure 7:
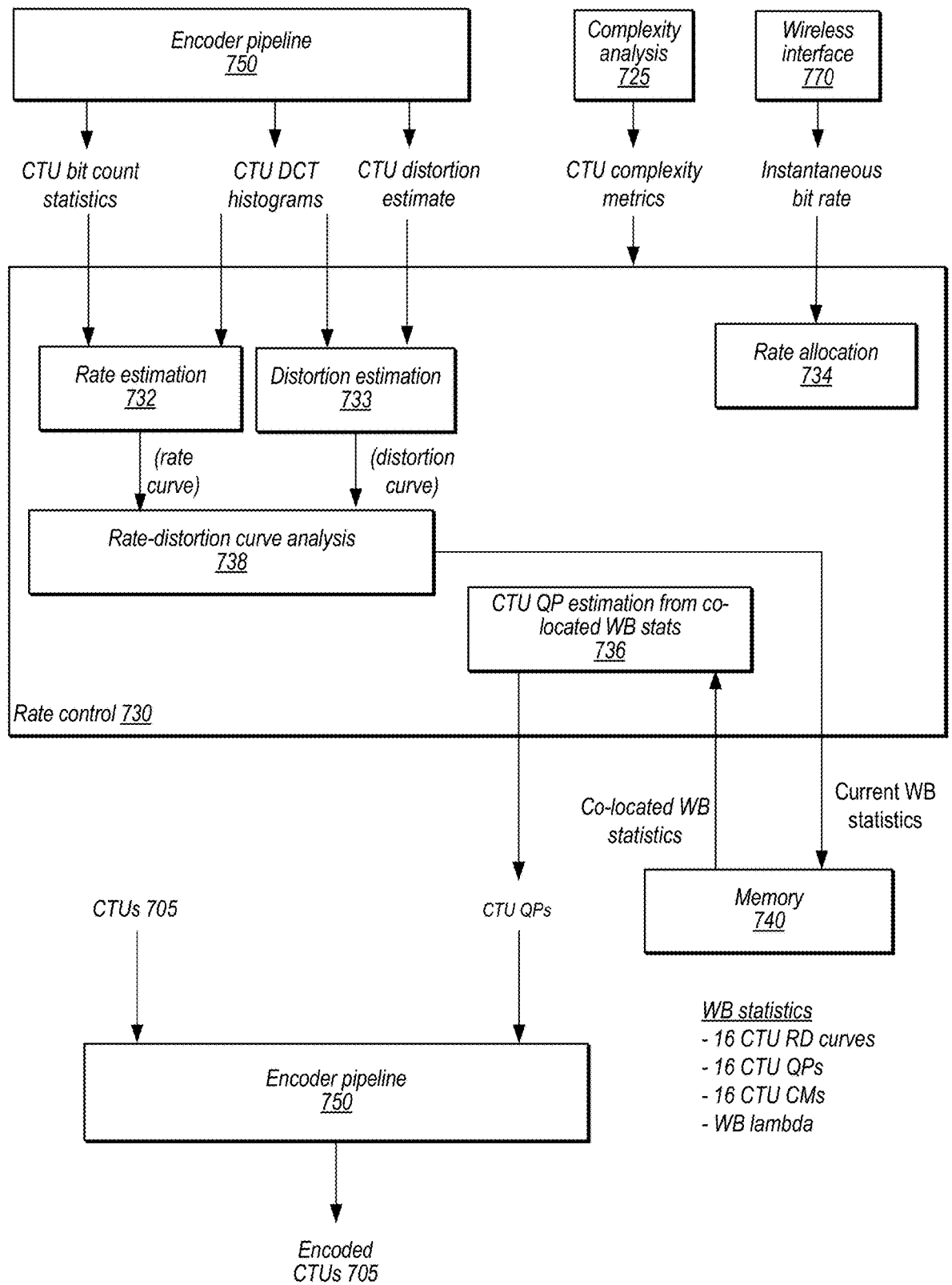
FIG. 7 is a block diagram illustrating operations of a rate control component of an encoder, according to at least some embodiments.

FIG. 7 is a block diagram illustrating operations of a rate control component of an encoder, according to at least some embodiments.

In some embodiments, a complexity analysis 725 component calculates complexity statistics for the CTUs in a strip from a current frame. In some embodiments, for each CTU, the complexity metric is an N-bit estimate of the entropy of that CTU. The complexity analysis 725 component provides the CM for the CTUs in each wavelet block of the strip to the rate control 730 component of the encoder. In some embodiments, the rate control 730 component receives the CMs for all CTUs in a strip before the encoder begins to encode the strip.

In some embodiments, the wireless interface 770 may track the instantaneous bit rate of the wireless connection 780, and feeds the current bit rate back to the rate control 730 component. The rate control 730 component then uses this instantaneous bit rate as a constraint when estimating the QPs for wavelet blocks. In some embodiments, before encoding a strip from a current frame, a rate allocation 734 component of rate control 730 uses the instantaneous bit rate to determine $R_{stripTarget}$, the target number of bits for all wavelet blocks contained in the strip. $R_{stripTarget}$ may be allocated proportionally to each wavelet blocks. In some embodiments, more bits may be allocated from $R_{stripTarget}$ to wavelet blocks that contain CTUs with larger complexity metrics, while fewer bits may be allocated to wavelet blocks that contain CTUs with smaller complexity metrics. The number of bits allocated to a wavelet block may be referred to as a rate bound for the wavelet block.

Rate control 730 component generates rate-distortion (RD) curves for every CTU processed in the encoder pipeline 750 based on the following data stored by the encoding pipeline 750:

- a discrete cosine transform (DCT) histogram (a histogram of unquantized DCT coefficients for the CTU);
- bit count statistics from CABAC encoding of the CTU at a particular QP; and
- a CTU distortion estimate.

A rate estimation 732 component may determine a rate curve based on the DCT histograms and the bit count statistics using a rate estimation method as described herein. A distortion estimation 733 component may determine a distortion curve based on the DCT histograms and the CTU distortion estimates using a distortion estimation method as described herein. A rate-distortion curve analysis 738 component may determine the 16 QPs and WB lambda for each wavelet block based on analysis of the respective RD curve as described herein.

The RD curves for all CTUs in a frame are stored in memory 750. The stored RD curves are used by a CTU QP estimation 736 component of rate control 730 in combination with rate allocation 734 output to estimate the rate of the co-located CTU blocks on the next frame at any QP value. The CTU complexity metrics for each wavelet block in the current frame are also stored in memory 740 and used to scale the RD curves before rate estimation. The QPs for the CTUs in the wavelet blocks of the current frame, determined from the stored RD curves for the CTUs in the wavelet blocks the previous frame, are provided to encoder pipeline 750 and used there to encode the respective CTUs 705 in the current frame.

Figure 8:
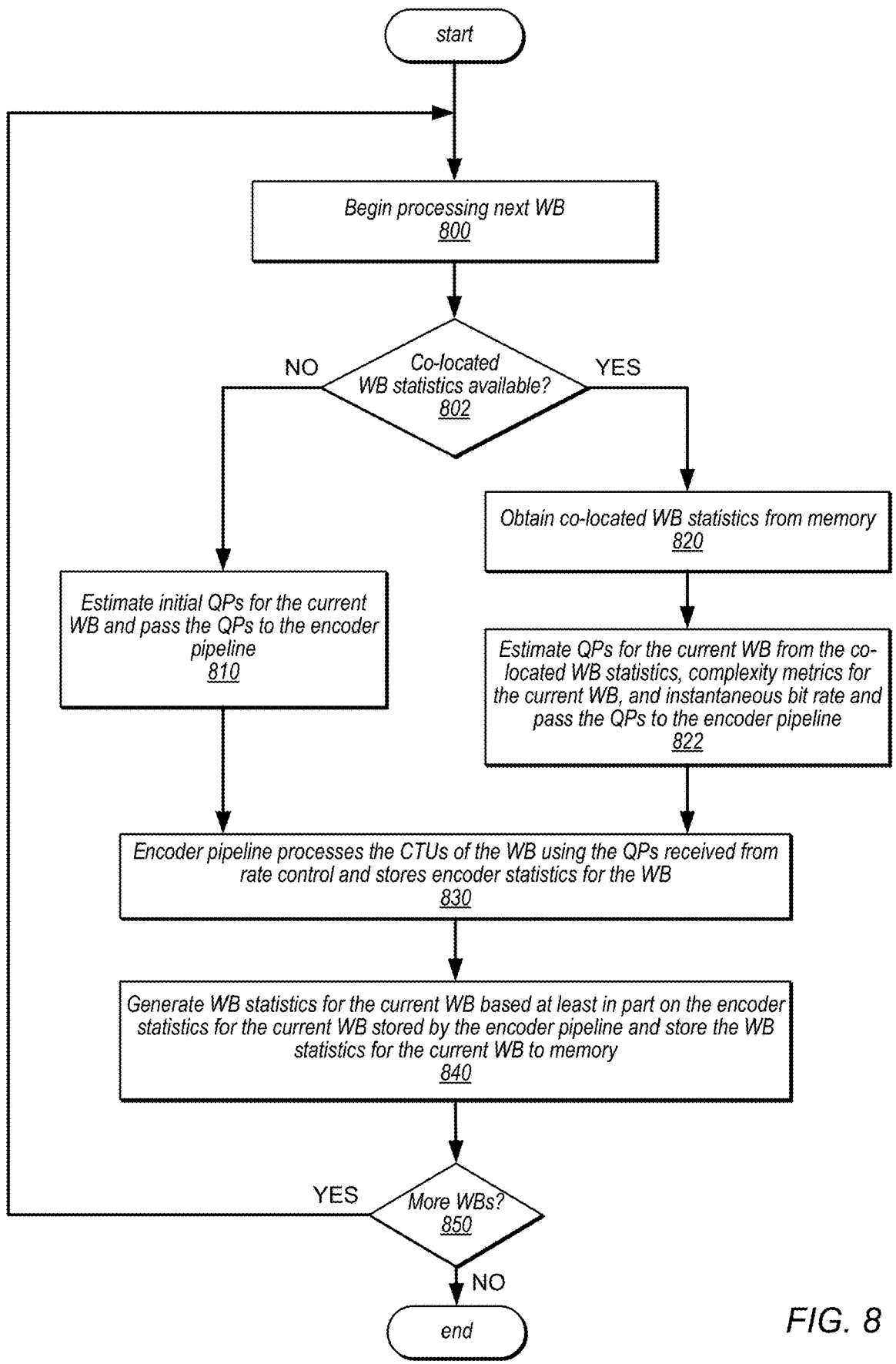
FIG. 8 is a flowchart of a method of operation for a rate control component as illustrated in FIG. 7, according to some embodiments.

FIG. 8 is a flowchart of a high-level method of operation for a rate control component as illustrated in FIG. 7, according to some embodiments. Note that, for an initial frame, WB statistics from a previous frame are not available. As indicated at 800, rate control begins processing a next wavelet block (WB). At 800, if co-located WB statistics are not available for the WB (e.g., if the WB is in a first frame), then initial QPs for the current WB may be estimated and passed to the encoder pipeline. At 800, if co-located WB statistics are available for the WB, then rate control obtains co-located WB statistics from memory as indicated at 820. As indicated at 822, rate control estimates QPs for the current WB from the co-located WB statistics, complexity metrics for the current WB, and rate information for the WB and passes the QPs to the encoder pipeline.

At 830, the encoder pipeline processes the CTUs of the WB using the QPs received from rate control and stores encoder statistics (DCT histograms, bit count statistics, and distortion estimates).

At 840, rate control generates WB statistics for the current WB based at least in part on the encoder statistics for the current WB and stores the WB statistics for the current WB to memory.

At 850, if there are more WBs to be processed, the method returns to element 800. Otherwise, the method is done.

Finding QPs to Minimize Wavelet-Inverse Distortion Given Rate Bound

In Embodiments of a Rate Control Component as Illustrated in FIGS. 5 and 7, the quantization parameters for the CTUs in a wavelet block may be calculated globally to jointly optimize bandwidth usage and the overall displayed quality of the video data after decoder reconstruction and wavelet synthesis is performed on the target device. Embodiments of the rate control component may implement a method for rate allocation between the subbands in a block that estimates quantization parameters (QPs) for the CTUs in a block (e.g., QPs for the 16 CTUs in a wavelet block (WB)) to minimize wavelet-inverse distortion for the wavelet block given a rate bound for the wavelet block:

$$\underset{QP_0,\cdots QP_{15}}{\text{minimize}} \|W^{-1}(WB) - W^{-1}H^{-1}H(WB)\|_2^2, \quad (1)$$

$$\text{subject to} \sum_{n=0}^{15} R_n \le R_{wbTarget}$$

where $W^{-1}$ is the inverse wavelet transform, H is the HEVC encoding of $CTU_n$ with $QP_n$ for $0<=n<=15$, $H^{-1}$ is the HEVC decoding of encoded $CTU_n$ for $0<=n<=15$, $R_n$ is the number of bits required to HEVC-encode $CTU_n$ with $QP_n$, and $R_{wbTarget}$ is the target rate bound.

Embodiments of the rate control component may implement a method to estimate the global minimizing QPs for a wavelet block in which, for each CTU in a wavelet block (i.e., the 16 CTUs), a curve is generated (referred to as a rate-distortion curve) that maps the distortion and the number of bits (rate) for that CTU. A given point on a rate-distortion curve indicates distortion at a given bit rate for the corresponding CTU. Once the rate-distortion curves for the 16 CTUs are generated, the rate control component finds a point on each curve where the slope is the same for all the rate-distortion curves. The QPs associated with those equally sloped points are the 16 global minimizing QPs for the current wavelet block.

To generate the rate-distortion curves for the 16 CTUs, a rate curve and a distortion curve need to be determined for each CTU. The encoder provides encoding statistics for each CTU to the rate control component, the encoding statistics including a discrete cosine transform (DCT) histogram (a histogram of unquantized DCT coefficients for the CTU), bit count statistics, and a distortion estimate. A key observation is that the unquantized DCT histogram contains all of the quantized histograms. Thus, the unquantized DCT histogram can be used to extrapolate the rate-distortion curves for a respective CTU at any QP. The rate-distortion curves for the 16 CTUs of a wavelet block in a current frame may be stored to a memory and used to estimate the QPs for a co-located wavelet block in a next frame. Complexity metrics determined for a current wavelet block may be used to correct the stored statistics from the co-located wavelet block of a previous frame.

Figure 9:
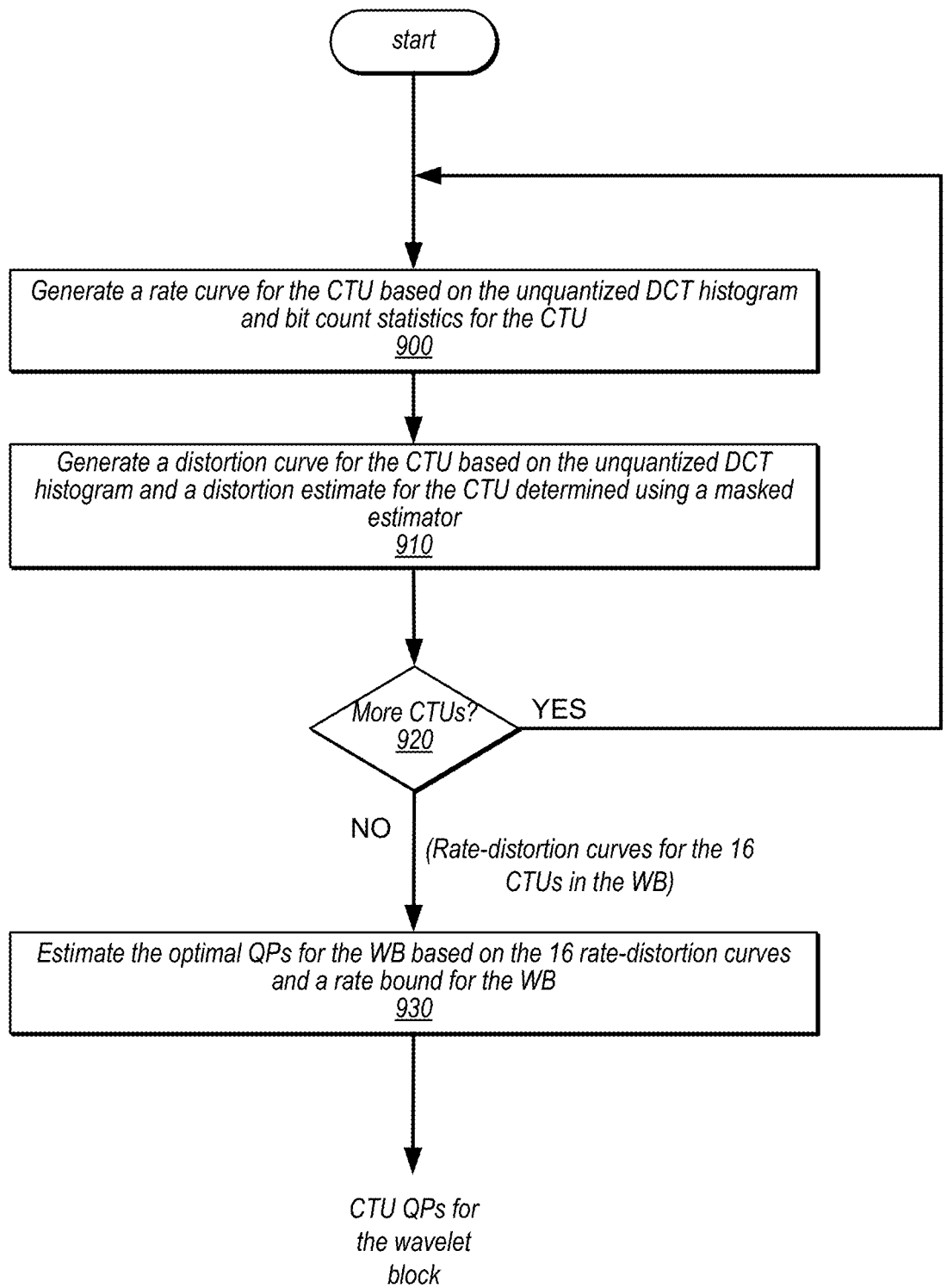
FIG. 9 is a high-level flowchart of a method for estimating optimal quantization parameters (QPs) for a wavelet block, according to some embodiments.

FIG. 9 is a high-level flowchart of a method for estimating optimal quantization parameters (QPs) for a wavelet block, according to some embodiments. The method of FIG. 9 may, for example, be performed at element 840 of FIG. 8. The CTUs in a wavelet block may be compressed by an encoder pipeline of an encoder using QPs determined from wavelet block statistics for a co-located wavelet block in a previous frame that were stored to a memory. Encoding statistics for each of the CTUs including but not limited to an unquantized DCT histogram, bit count statistics, and a distortion estimate determined in part using a masked estimator described below may be passed to a rate control component of the encoder.

Elements 900 through 930 may be performed by the rate control component of the encoder. As indicated at 900, a rate curve is generated for the CTU based on the unquantized DCT histogram and bit count statistics for the CTU. As indicated at 910, a distortion curve is generated for the CTU based on the unquantized DCT histogram and the distortion estimate for the CTU. As indicated at 920, elements 900 and 910 are performed for all 16 CTUs in the wavelet block to generate the 16 rate-distortion curves for the wavelet block. As indicated at 930, the 16 optimal QPs for the 16 CTUs in the wavelet block are estimated based on the 16 rate-distortion curves and a rate bound for the wavelet block determined from instantaneous bit rate statistics received from a wireless interface. For example, a bisection search may be used to find a point on each curve where the slope is the same for all the rate-distortion curves. The QPs associated with those equally sloped points are the 16 global minimizing QPs for the wavelet block. Wavelet block statistics for the wavelet block, including but not limited to the rate-distortion curves, the optimal QPs, complexity metrics, and a WB lambda may be stored to the memory for use in encoding a co-located wavelet block on a next frame.

Rate Estimation

Embodiments of a method for determining the rate curves for the CTUs are described. In embodiments, the histogram of unquantized DCT coefficients for a CTU is represented as a power-of-two bin structure that stores the absolute value of the coefficients. The power-of-two bin structure allows relatively simple rate and distortion estimates to be performed in hardware by the rate control component. The bit count statistics are also stored. When estimating the QPs for a wavelet block in a current frame, the rate curves for the CTUs may be estimated from the respective unquantized DCT histograms and bit count statistics stored by the encoder.

The rate control component generates Rate vs QP Curves (RQCs) for every CTU processed in the encoder pipeline based on the following data stored by the encoding pipeline:
  a discrete cosine transform (DCT) histogram (a histogram of unquantized DCT coefficients for the CTU); and
  bit count statistics (BCS) from CABAC encoding of the CTU at a particular QP.

In some embodiments, the RQCs for all CTUs in a frame are stored in memory. The stored RQCs are used by the rate control component to estimate the rate of the co-located CTU blocks on the next frame at any QP value. The CTU complexity metrics for each wavelet block in the current frame are also stored in memory and used to scale the RQCs before rate estimation.

In some embodiments, for each CTU, the RQC is a structure that includes:
  integer rate[3][7]
  integer QP_actual In some embodiments, a GPP (Gradient Per Pixel) complexity metric (gpp) of each wavelet block may be used to scale all RQCs in that wavelet block. The GPP complexity metric is described in Jing, Xuan, Lap-Pui Chau, and Wan-Chi Siu, "Frame complexity-based rate-quantization model for H. 264/AVC intraframe rate control." IEEE Signal processing letters 15 (2008): 373-376.

For each CTU, the DCT histogram ($DCTH_1$) may be a structure that includes:
  integer $bin_1[16]$
  integer $numTwos_1$
  integer $sumNonZero_1$ In some embodiments, the $DCTH_1$ bins tally luma DCT coefficients before quantization, or equivalently at quantization step size (qstep)=1. In the preceding notation, the subscript ($_1$) indicates that the histogram represents DCT coefficients at qstep=1. The bin widths increase in size exponentially. The $bin_1[i]$ counts the frequency of unquantized, luma DCT coefficients whose magnitude is in the interval [floor($2^{(i-1)}$), $2^i-1$], for $0<=i<=15$. The last bin ($bin_1[15]$) counts the frequency of DCT coefficients whose magnitude is in the interval [16384, 32768]. Thus, the association of intervals to bins is as follows:
  $bin_1[0]$: [0, 0]
  $bin_1[1]$: [1, 1]
  $bin_1[2]$: [2, 3]
  $bin_1[3]$: [4, 7]
  $bin_1[4]$: [8, 15]
  . . .
  $bin_1[14]$: [8192, 16383]
  $bin_1[15]$: [16384, 32768]

To better estimate $coeffAbsGt2_1$ (see below), the $numTwos_1$ field tracks the number of 2s in $bin_1[2]$. The $sumNonZero_1$ field holds the sum of all bin frequencies except for $bin_1[0]$.

For each CTU, the BCS is a structure with fields that correspond to syntax elements that were aggregated while CABAC encoding the entire CTU at a particular QP. Here are the BCS fields:
1. integer $total_{actual}$: stores the total number of bits required for CABAC encoding of the CTU.
2. integer $partitioning_{actual}$: stores the number of bits required to encode how the CTU was partitioned.
3. integer $residual_{actual}[3]$: stores the number of bits required to encode Y, Cb and Cr residuals.
4. integer $sigCoeff_{actual}$: stores the number of bits required to encode all luma sig_coeff_flag symbols in the CTU.
5. integer $coeffAbsGt1_{actual}$: stores the number of bits required to encode all luma coeff_abs_level_greater1_flag symbols in the CTU.
6. integer $coeffAbsGt2_{actual}$: stores the number of bits required to encode all luma coeff_abs_level_greater2_flag symbols in the CTU.
7. integer $remain_{actual}$: stores the number of bits required to encode all luma coeff_abs_level_remaining symbols in the CTU.
8. integer $otherCoeff_{actual}$: stores the difference between $residual_{actual}[0]$ and the sum of #4, #5, #6, #7.

The BCS fields are related thusly:
a) $total_{actual}$=$partitioning_{actual}$+$residual_{actual}[0]$+$residual_{actual}[1]$+$residual_{actual}[2]$, where $residual_{actual}[0]$, $residual_{actual}[1]$, $residual_{actual}[2]$ are the number of bits for residuals of Y, Cb, Cr components
b) $residual_{actual}[0]$=$otherCoeff_{actual}$+ $sigCoeff_{actual}$+ $coeffAbsGt1_{actual}$+ $coeffAbsGt2_{actual}$+ $remain_{actual}$ Rate Vs QP Curve (RQC) Estimation To implement an efficient RQC estimation algorithm in hardware, the following should be considered:
I. The length of the CABAC binarization of the coeff_abs_level_remaining syntax element scales logarithmically with the magnitude of the DCT coefficient. Table 1 shows a representation of coeff_abs_level_remaining binarization as a concatenation of a unary prefix and a fixed length suffix, according to some embodiments.
II. For any dyadic qstep, the histogram of quantized DCT coefficients can be derived from $DCTH_1$ by performing simple operations on the bin fields of $DCTH_1$. (A dyadic quantity is one that can be expressed as a power of two: $2^N$, for natural N.)

To illustrate (II), let $DCTR_{qstep}$ denote a structure analogous to $DCTH_1$ in which the fields represent the histogram of DCT coefficients after quantization by qstep. The $DCTR_{qstep}$ is a structure that includes these fields:

integer $bin_{qstep}$ [16]
integer $numTwos_{qstep}$
integer $sumNonZero_{qstep}$ The following examples illustrate the derivation of $DCTH_{qstep}$ from $DCTH_1$ for qstep=2N, N>0.

When qstep=2:
$bin_2[0]=bin_1[0]+bin_1[1]$,
$bin_2[1]=bin_1[2]$,
$bin_2[2]=bin_1[3]$,
...
$bin_2[14]=bin_1[15]$,
$bin_2[15]=0$.

When qstep=4:
$bin_4[0]=bin_1[0]+bin_1[1]+bin_1[2]$,
$bin_4[1]=bin_1[3]$,
$bin_4[2]=bin_1[4]$,
...
$bin_4[13]=bin_1[15]$,
$bin_4[14]=bin_4[15]=0$.

Thus, the DCT histogram for any dyadic qstep can be derived from the frequencies of unquantized coefficients in the $DCTH_1$ using relatively simple arithmetic.

3. Compute correction factors for 2a, 2b, 2c, 2d by comparing against the corresponding bit count statistics (BCS) fields.
4. Estimate partitioning and other bits by scaling:
   If $sumNonZero_1>0$
       $scaleFactor=clip(sumNonZero_{qstep}/sumNonZero_1, 0, 2)$
       $partitioning_{est}=partitioning_{actual}*scaleFactor$
       $otherCoeff_{est}=otherCoeff_{actual}*scaleFactor$
   Else
       $partitioning_{est}=partitioning_{actual}$
       $otherCoeff_{est}=otherCoeff_{actual}$
5. $Rate_{est}(QP)=partitioning_{est}+otherCoeff_{est}+sigCoeffBits_{est}+coeffAbsGt1_{est}+coeffAbsGt2_{est}+remainBits_{est}$ Luma RQC Estimation The following is an example algorithm that may be used to estimate the luma RQC at QPs associated with dyadic qsteps:

For each QP in {16, 22, 28, 34, 40, 46, 63}:
   $qstep=2^{(QP-4)/6}$
   $RQC.rate[0][QP]=Rate_{est}[QP]$ Chroma RQC Estimation The chroma RQC may be estimated by assuming that chroma rates scale proportionally to luma rates:

TABLE 1

| z | Prefix bins | Suffix bins | Prefix length | Suffix length | Total length | Max k |
|---|---|---|---|---|---|---|
| $0 \sim 2 \cdot 2^k - 1$ | 0 | C | 1 | k | 1 + k | 4 |
| $1 \cdot 2^k \sim 2 \cdot 2^k - 1$ | 10 | C | 2 | k | 2 + k | 4 |
| $2 \cdot 2^k \sim 3 \cdot 2^k - 1$ | 110 | C | 3 | k | 3 + k | 4 |
| $2^k \cdot (2^0 + 2) \sim 2^k \cdot (2^1 + 2) - 1$ | 1110 | C | 4 | k | 4 + k | 4 |
| $2^k \cdot (2^1 + 2) \sim 2^k \cdot (2^2 + 2) - 1$ | 11110 | xC | 5 | 1 + k | 6 + k | 4 |
| $2^k \cdot (2^2 + 2) \sim 2^k \cdot (2^3 + 2) - 1$ | 111110 | xxC | 6 | 2 + k | 8 + k | 4 |
| $2^k \cdot (2^3 + 2) \sim 2^k \cdot (2^4 + 2) - 1$ | 1111110 | xxxC | 7 | 3 + k | 10 + k | 4 |
| $2^k \cdot (2^4 + 2) \sim 2^k \cdot (2^5 + 2) - 1$ | 11111110 | xxxxC | 8 | 4 + k | 12 + k | 4 |
| $2^k \cdot (2^5 + 2) \sim 2^k \cdot (2^6 + 2) - 1$ | 111111110 | xxxxxC | 9 | 5 + k | 14 + k | 4 |
| $2^k \cdot (2^6 + 2) \sim 2^k \cdot (2^7 + 2) - 1$ | 1111111110 | xxxxxxC | 10 | 6 + k | 16 + k | 4 |
| $2^k \cdot (2^7 + 2) \sim 2^k \cdot (2^8 + 2) - 1$ | 11111111110 | xxxxxxxC | 11 | 7 + k | 18 + k | 4 |
| $2^k \cdot (2^8 + 2) \sim 2^k \cdot (2^9 + 2) - 1$ | 111111111110 | xxxxxxxxC | 12 | 8 + k | 20 + k | 4 |
| $2^k \cdot (2^9 + 2) \sim 2^k \cdot (2^{10} + 2) - 1$ | 1111111111110 | xxxxxxxxxC | 13 | 9 + k | 22 + k | 4 |
| $2^k \cdot (2^{10} + 2) \sim 2^k \cdot (2^{11} + 2) - 1$ | 11111111111110 | xxxxxxxxxxC | 14 | 10 + k | 24 + k | 4 |
| $2^k \cdot (2^{11} + 2) \sim 2^k \cdot (2^{12} + 2) - 1$ | 111111111111110 | xxxxxxxxxxxC | 15 | 11 + k | 26 + k | 3 |
| $2^k \cdot (2^{12} + 2) \sim 2^k \cdot (2^{13} + 2) - 1$ | 1111111111111110 | xxxxxxxxxxxxC | 16 | 12 + k | 28 + k | 2 |
| $2^k \cdot (2^{13} + 2) \sim 2^k \cdot (2^{14} + 2) - 1$ | 11111111111111110 | xxxxxxxxxxxxxC | 17 | 13 + k | 30 + k | 1 |
| $2^k \cdot (2^{14} + 2) \sim 2^k \cdot (2^{15} + 2) - 1$ | 111111111111111110 | xxxxxxxxxxxxxxC | 18 | 14 + k | 32 + k | 0 |

Luma Rate Estimation at Dyadic Qstep

The following is an example algorithm that may be used to estimate the luma rate at a dyadic qstep, in some embodiments:

1. Derive $DCTR_{qstep}$ from $DCTH_1$
2. From $DCTH_{qstep}$ fields, estimate these CABAC syntax elements for CTU coefficients quantized by qstep:
   a) $sigCoeffBits_{est}=sumNonZero_{qstep}$
   b) $coeffAbsGt1_{est}=sigCoeffBits_{est}-bin_{qstep}[1]$
   c) $coeffAbsGt2_{est}=coeffAbsGt1_{est}-numTwos_{qstep}$
   d) $remainBits_{est}$=weighted sum of expected values of binarization lengths of coeff_abs_level_remaining symbols associated with each $DCTH_{qstep}$ bin.
      Each $DCTH_{qstep}$ bin is associated with one or more rows of Table 1.
      The binarization length of the symbol in a row is given by the Total length column of Table 1.
      The expectation assumes that coefficients are uniformly distributed within $DCTH_{qstep}$ bins.
      The weight of each $DCT_{qstep}$ bin is its frequency.

For each chromaId in {1, 2}:
   For each QP in {16, 22, 28, 34, 40, 46, 63}:

$RQC.rate[chromaId][QP]=residual_{actual}[chromaId]*$
   $RQC.rate[0][QP]/(residual_{actual}[0]+partitioning_{actual})$ RQC Corrections The RQCs for all CTUs in a frame are stored in memory and may be used to estimate co-located CTU rates in the next frame. In some embodiments, one or more corrections may be applied to the RQCs before they are used for estimation.

Additive Correction Term from Pre-Coded Estimate

Before a CTU is encoded, the co-located, previous-frame RQCs are used to estimate the CTU rate after encoding at a desired QP denoted by QP_actual. This estimated rate is $R_{est}=RQC.rate[0][QP\_actual]+RQC.rate[1][QP\_actual]+RQC.rate[2][QP\_actual]$.

The CTU is then encoded at QP_actual and the actual coded rate is obtained from the BCS as $R_{actual}=total_{actual}$. As explained earlier, the BCS and $DCTH_1$ are used to generate RQCs that will be used on the next frame. The difference $R_{actual}-R_{est}$ is a correction term. Assuming that the co-located CTU on the next frame is similar, this correction is applicable to the RQC estimate on the next frame. Therefore, the correction term, $R_{actual}-R_{est}$, may be added to the RQCs before storing them in memory with RQC.QP_actual=QP_actual.

Propagative Correction Term from Co-Located RQC

In the section titled Luma Rate Estimation at dyadic qstep, the correction factors are accurate at QP_actual and less accurate at QPs farthest away from QP_actual. Consequently, the rate estimate at QP_actual is exact and the rate estimates at QPs farthest away from QP_actual are less accurate. If the co-located CTU on the previous frame was similar to the current CTU and was encoded at $QP'_{actual}$ with $QP'_{actual} \neq QP\_actual$, then the co-located RQCs can be used to generate correction terms that are most effective at QPs close to $QP'_{actual}$. Therefore, these propagative correction terms may be added to the current RQCs before storing them in memory.

Multiplicative Correction Factor from Complexity Ratio

The CTU rate estimate may be based on co-located RQCs in the previous frame. This estimate is accurate if the co-located and current CTUs are similar. Typically, such CTUs are indeed similar, but their RQCs may differ to some extent. To account for these differences, a complexity scaling factor may be computed:

$$scaleFactor_{cmplxty}=gpp/gpp',$$

where gpp and gpp' are the GPP complexities of the current and co-located wavelet blocks, respectively. Before using the co-located RQCs to estimate the current CTU rate, all rates in the co-located RQCs may be scaled by $scaleFactor_{cmplxty}$ to scale the co-located RQCs so that they are applicable to the current CTU.

Distortion Estimation

Embodiments of a method for determining the distortion curves for the CTUs when using a biorthogonal wavelet transform to generate the subbands are described. Embodiments may implement a method for efficient, accurate, estimation of mean-squared error (MSE) in biorthogonal, wavelet transforms. The encoder pipeline encodes one CTU (also referred to as a subblock) at a time, and provides a distortion estimate for that CTU to the rate control component. However, the distortion that is of interest is the distortion after decoding and wavelet synthesis is performed on the entire block (all 16 subblocks (CTUs) covering seven subbands, for example as illustrated in FIG. 4) at the target device. Thus, a challenge is to estimate the contribution of the distortion in one CTU to the distortion at the target device which comes from the wavelet synthesis of all 16 decoded CTUs.

Embodiments of a masked estimator are described that can be applied to each CTU to estimate the MSE for the CTU (i.e., the distortion of the wavelet inverse of a biorthogonal subband). The masked estimator may implement a 5×5 weight mask for each subband generated by the biorthogonal wavelet transform. The 5×5 masks weight the errors and their correlations. Within a subband, the 5×5 mask computes intra-subband error energy, and thus includes intra-subband correlations in the distortion estimate. The distortion estimates (MSEs) for the 16 CTUs may then be used to estimate the distortion curves for the respective wavelet block.

In some embodiments, the 5×5 masks may be simplified using thresholding to generate low-complexity weight masks; the masked estimator can then apply these low-complexity masks to error correlations in each subband to generate distortion estimates for the CTUs. The low-complexity masks approximate the 5×5 masks with only five non-zero weights at the center, above center, below center, left of center, and right of center. For the LLLL, LLHH and HH subbands, the low-complexity masks require only two multiplies and four additions. For the LLLH, LLHL, HL and LH subbands, the low-complexity masks require only three multiplies and four additions. Within a subband, the low-complexity mask computes intra-subband error energy, and thus includes intra-subband correlations in the distortion estimate. The distortion estimates (MSEs) for the 16 CTUs may then be used to estimate the distortion curves for the respective wavelet block.

Biorthogonal wavelet transforms may, for example be used for image/video compression and can also be added to systems that use non-wavelet compression to provide graceful degradation. In both applications, the wavelet coefficients are quantized to control the encoded bitrate. Increasing the quantization level decreases the bitrate but increases the distortion; conversely, decreasing the quantization level increases the bitrate but decreases the distortion. The distortion is usually measured as the Mean-Squared Error (MSE) of the reconstructed image. Because image reconstruction is expensive (time, hardware, software) at the encoder, the MSE associated with different quantization levels may be estimated. Embodiments of the masked estimator for biorthogonal MSE may provide a significant reduction in estimation error with minimal complexity increase (two or three multiplies, four additions) when compared to conventional methods for estimating distortion.

Embodiments of the masked estimator for biorthogonal wavelet transform MSE estimation may, for example, be employed in the low-latency, block-based rate control method described herein when generating rate-distortion curves from which quantization parameters for blocks are derived. However, embodiments of the masked estimator may also be used in any application to estimate MSE for biorthogonal wavelet transforms.

For each CTU, the distortion estimate (DE) is an estimate of the contribution of the quantized CTU to the sum of squared error after HEVC decoding and the inverse wavelet transform. Mathematically:

$$DE_{CTU} \approx 2^{10} \|W^{-1}H^{-1}H(CTU)-W^{-1}(CTU)\|_2^2$$

where $W^{-1}$ is the inverse wavelet transform, H is the HEVC encoding of CTU, and $H^{-1}$ is the HEVC decoding of encoded CTU.

As previously mentioned, the distortion that is of interest is the distortion after decoding and wavelet synthesis is performed on the encoded wavelet block at the target device (referred to as total distortion for the wavelet block, or $D_{wb}$). A challenge is to estimate the contribution of the distortion in the individual subblocks to the total distortion at the target device, which comes from the wavelet synthesis of all 16 decoded CTUs. A method to estimate the total distortion for a wavelet block is to sum the weighted distortion (MSE) in each subblock (CTU). Assuming a wavelet block with 16 CTUs that represent seven subbands as illustrated in FIG. 4:

$$D_{wb}=\Sigma_{n=0}^{15} w_n(DE_{CTU_n}),$$

where $w_n$ are weights for $0 \leq n \leq 15"$.

A challenge is to determine the weights to use to estimate MSE for the CTUs. Since the 16 subblocks (CTUs) represent seven subbands (LLLL, LLLH, LLHL, LLHH, LH, HL, and HH), seven distinct weights are needed.

A previous method used power spectral density to derive the weights (J. Woods, T. Naveen—A filter based bit allocation scheme for subband compression of HDTV, IEEE Transactions on Image Processing, 1(3), 436-440, 1992). Usevitch used tensor analysis to derive similar weights to those of Woods-Naveen (B. Usevitch-Optimal bit allocation for biorthogonal wavelet coding, Proceedings of the Data Compression Conf., 1996). However, both of these methods ignore intra-subband and inter-subband correlations, and thus exhibit up to 30% error at lower peak signal-to-noise ratio (PSNR).

In particular, Usevitch makes two assumptions to make the math tractable:

Assumption 1: no inter-subband correlation, so ignore cross terms.

Assumption 2: no intra-subband correlation, so autocorrelation is diagonal.

Figure 10:
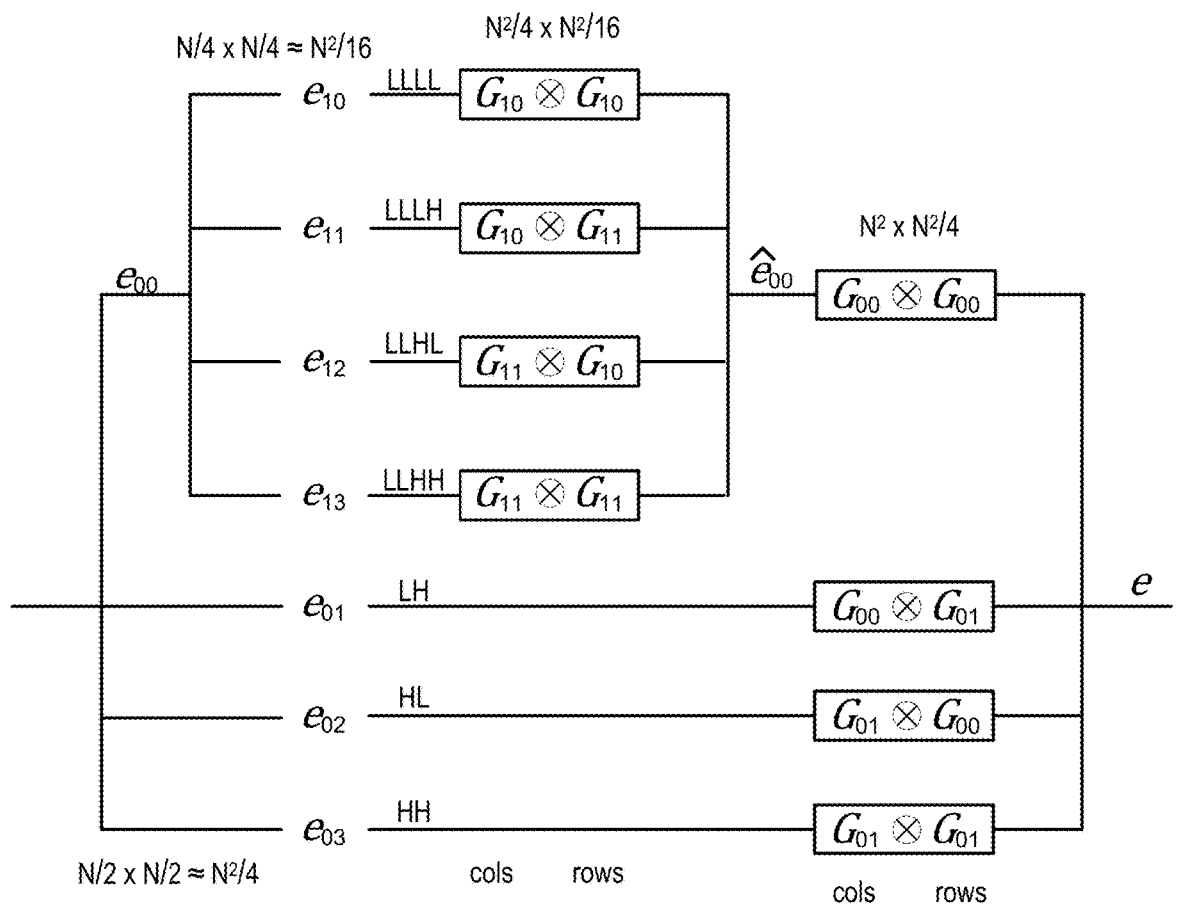
FIG. 10 shows a model used in tensor analysis of the two-level, 2D case for deriving weights for two-level, 2D MSE estimation, according to some embodiments.

Usevitch' method generates seven single weights for the seven subbands. Usevitch provides details for the 1D, single-level case only. However, Usevitch does not provide tensor analysis of the two-level, 2D case as shown in the model of FIG. 10 and described below. In embodiments as described below, tensor analysis is performed without assuming that there is no (or negligible) intra-subband correlation. Thus, full correlation is used. By not making the assumptions made by Usevitch, instead of generating a single weight to apply to subbands as in Usevitch, N×N (e.g., 5×5) masks may be generated that weight the errors and their correlations within the subbands. This method thus generates an N×N (e.g., 5×5) weight mask for each subband generated by the biorthogonal wavelet transform (LLLL, LLLH, LLHL, LLHH, LH, HL, and HH), for example as illustrated in FIG. 11, which shows example 5×5 masks using a (1,2) normalization technique, for example as described in Section 2.2.3 of Rabbani, Majid, and Rajan Joshi. "An overview of the JPEG 2000 still image compression standard." *Signal processing: Image communication* 17.1 (2002): 3-48. A masked estimator can then apply these N×N masks to errors and their correlations in each subband to generate distortion estimates for the subbands. The masks compute intra-subband energy and thus consider intra-subband correlations in the distortion estimates. By applying the N×N weight masks instead of the single weights, a more accurate distortion estimate may be produced (e.g., 5% or less error, at lower PSNR, instead of up to 30% error using conventional methods).

Referring to FIG. 10, the following describes a tensor analysis of the two-level, 2D case for deriving weights for two-level, 2D MSE estimation:

$e_{is}$=row-major error vector at Level i with s=0/1/2/3=LL/LH/HL/HH $G_{ij}$=Upsample/filter matrix at Level i with j=0/1=lowpass/highpass $G_{ij} \otimes G_{ik}$=tensor product of $G_{ij}$ and $G_{ik}$ tr: trace function. The trace of a square matrix is the sum of elements on the main diagonal.

$$e = \mathbb{G}_{10}e_{10} + \mathbb{G}_{11}e_{11} + \mathbb{G}_{12}e_{12} + \mathbb{G}_{13}e_{13} + \mathbb{G}_{01}e_{01} + \mathbb{G}_{02}e_{02} + \mathbb{G}_{03}e_{03} \quad (1)$$

where $\mathbb{G}_{10} = (G_{00} \otimes G_{00})(G_{10} \otimes G_{10})$, and $\mathbb{G}_{10}$ $(G_{00} \otimes G_{00})$, and $(G_{10} \otimes G_{10})$ have dimensions $N^2 \times N^2/16$, $N^2 \times N^2/4$, and $N^2/4 \times N^2/16$, respectively, $\mathbb{G}_{11} = (G_{00} \otimes G_{00})(G_{10} \otimes G_{11})$, $\mathbb{G}_{12} = (G_{00} \otimes G_{00})(G_{11} \otimes G_{10})$, $\mathbb{G}_{13} = (G_{00} \otimes G_{00})(G_{11} \otimes G_{11})$, $\mathbb{G}_{01} = (G_{00} \otimes G_{01})$, where $\mathbb{G}_{01}$ has dimension $N^2 \times N^2/4$, $\mathbb{G}_{02} = (G_{01} \otimes G_{00})$, $\mathbb{G}_{03} = (G_{01} \otimes G_{01})$.

The distortion is the mean-squared error given by:

$$\sigma_e^2 = \frac{1}{N^2} E[e^T e]$$

$$= \frac{1}{N^2} E\left[\left(\sum_{a \in S} \mathbb{G}_a e_a\right)^T \left(\sum_{b \in S} \mathbb{G}_b e_b\right)\right],$$

where $S = \{10, 11, 12, 13, 01, 02, 03\}$ $$= \frac{1}{N^2} E\left[\sum_{a \in S} e_a^T \mathbb{G}_a^T \sum_{b \in S} \mathbb{G}_b e_b\right]$$

$$= \frac{1}{N^2} E\left[tr\left(\sum_{a \in S} \mathbb{G}_a e_a \sum_{b \in S} e_b^T \mathbb{G}_b^T\right)\right]$$

$$= \frac{1}{N^2} E\left[tr\left(\sum_{a \in S} \mathbb{G}_a e_a e_a^T \mathbb{G}_a^T\right)\right],$$

ignore cross-terms assuming no inter-subband correlations.

$$= \frac{1}{N^2} E\left[tr \sum_{a \in S} \mathbb{G}_a^T \mathbb{G}_a e_a e_a^T\right]$$

$$\sigma_e^2 = \frac{1}{N^2} tr \sum_{a \in S} \mathbb{G}_a^T \mathbb{G}_a R_{e_a e_a}, \quad (2)$$

where $R_{e_a e_a}$ is the non-diagonal autocorrelation because intra-subband correlations are not ignored.

$$E_e = \sum_{a \in S} tr(\mathbb{G}_a^T \mathbb{G}_a R_{e_a e_a}), \quad (3)$$

where $E_e = N^2 \sigma_e^2$, which is numerically more stable than $\sigma_e^2$.

$$R_{e_a e_a} = \begin{bmatrix} e_0^2 & e_0 e_1 & e_0 e_2 & e_0 e_3 & \cdot & \cdot \\ e_1 e_0 & e_1^2 & e_1 e_2 & e_1 e_3 & & \\ e_2 e_0 & e_2 e_1 & e_2^2 & e_2 e_3 & & \\ e_3 e_0 & e_3 e_1 & e_3 e_2 & e_3^2 & & \\ \cdot & & & & & \\ \cdot & & & & & e_N^2 \end{bmatrix} \quad (4)$$

The $M^{th}$ row of $\mathbb{G}_a^T \mathbb{G}_a$ is a row-majored vector representing a finitely-supported mask of this form:

$$col = M / N \quad (5)$$

$$row = M \mod N \to \begin{bmatrix} & & \cdots & & \\ \gamma_1 & \gamma_2 & \gamma_3 & \gamma_4 & \gamma_5 \\ \cdot & \gamma_6 & \gamma_7 & \gamma_8 & \gamma_9 & \gamma_{10} & \cdot \\ \cdot & \gamma_{11} & \gamma_{12} & \gamma_{13} & \gamma_{14} & \gamma_{15} & \cdot \\ \cdot & \gamma_{16} & \gamma_{17} & \gamma_{18} & \gamma_{19} & \gamma_{20} & \cdot \\ & \gamma_{21} & \gamma_{22} & \gamma_{23} & \gamma_{24} & \gamma_{25} \\ & & \cdots & & \end{bmatrix}$$

Correspondingly the $M^{th}$ column of $R_{e_a e_a}$ is a row-majored vector representing this matrix:

$$R_M = \begin{bmatrix} & & & \cdots & & & \\ \cdot & e_{r,c}e_{r-2,c-2} & e_{r,c}e_{r-2,c-1} & e_{r,c}e_{r-2,c} & e_{r,c}e_{r-2,c+1} & e_{r,c}e_{r-2,c+2} & \cdot \\ \cdot & e_{r,c}e_{r-1,c-2} & e_{r,c}e_{r-1,c-1} & e_{r,c}e_{r-1,c} & e_{r,c}e_{r-1,c+1} & e_{r,c}e_{r-1,c+2} & \cdot \\ \cdot & e_{r,c}e_{r,c-2} & e_{r,c}e_{r,c-1} & e_{r,c}e_{r,c} & e_{r,c}e_{r,c+1} & e_{r,c}e_{r,c+2} & \cdot \\ \cdot & e_{r,c}e_{r+1,c-2} & e_{r,c}e_{r+1,c+1} & e_{r,c}e_{r+1,c} & e_{r,c}e_{r+1,c+1} & e_{r,c}e_{r+1,c+2} & \cdot \\ & e_{r,c}e_{r+2,c-2} & e_{r,c}e_{r+2,c-1} & e_{r,c}e_{r+2,c} & e_{r,c}e_{r+2,c+1} & e_{r,c}e_{r+2,c+2} & \\ & & & \cdots & & & \end{bmatrix} \quad (6)$$

where r=M mod N, c=M/N.

$tr(\mathbb{G}_a^T \mathbb{G}_a R_{e_a e_a})$ requires only the products of the $M^{th}$ row of $\mathbb{G}_a^T \mathbb{G}_a$ and the $M^{th}$ column of $R_{e_a e_a}$ for all M. Therefore:

$$tr(\mathbb{G}_a^T \mathbb{G}_a R_{e_a e_a}) = \quad (7)$$
$$\sum_M e_{r,c}[\gamma_1 e_{r-2,c-2} + \gamma_2 e_{r-2,c-1} + \gamma_3 e_{r-2,c} + \gamma_4 e_{r-2,c-1} + \gamma_5 e_{r-2,c+2} +$$
$$\gamma_6 e_{r-1,c-2} + \gamma_7 e_{r-1,c-1} + \gamma_8 e_{r-1,c} + \gamma_9 e_{r-1,c+1} + \gamma_{10} e_{r-1,c+2} +$$
$$\gamma_{11} e_{r,c-2} + \gamma_{12} e_{r,c-1} + \gamma_{13} e_{r,c} + \gamma_{14} e_{r,c+1} + \gamma_{15} e_{r,c+2} +$$
$$\gamma_{16} e_{r+1,c-2} + \gamma_{17} e_{r+1,c-1} + \gamma_{18} e_{r+1,c} + \gamma_{19} e_{r+1,c+1} + \gamma_{20} e_{r+1,c+2} +$$
$$\gamma_{21} e_{r+2,c-2} + \gamma_{22} e_{r+2,c-1} + \gamma_{23} e_{r+2,c} + \gamma_{24} e_{r+2,c+1} + \gamma_{25} e_{r+2,c+2}]$$

for LLLL, LLHH, HH subbands.

Equation 3 is the general solution for the two-level, 2D case. Using a (5,3) filter bank (for example as described in Rabbani, Majid, and Rajan Joshi. "An overview of the JPEG 2000 still image compression standard." *Signal processing: Image communication* 17.1 (2002): 3-48) in this equation gives the finite-support 5×5 mask in Equation 5. The autocorrelation $R_{e_a e_a}$ in Equation 6 multiplies against this mask. Equation 7 shows the product of the mask and the autocorrelation. Substituting the specific (5,3) filter-bank coefficients into $\mathbb{G}_a$ for each subband yields the masks in FIG. 11. Due to symmetry, these masks have fewer than 25 distinct coefficients. For the specific example of FIG. 11, the mask is 5×5. In general, for other filters (other than the 5,3-filterbank), the mask may be larger or smaller than 5×5.

Implementing the 5×5 masks as illustrated in FIG. 11 in hardware may be computationally expensive. Thus, the 5×5 weight masks may be simplified using thresholding to generate low-complexity weight masks as illustrated in FIG. 12 that are less computationally expensive to implement in hardware. These low-complexity masks approximate the 5×5 masks of FIG. 11 with only five non-zero weights at the center, above center, below center, left of center, and right of center. For the LLLL, LLHH and HH subbands, the low-complexity masks require only two multiplies and four additions. For the LLLH, LLHL, HL and LH subbands, the low-complexity masks require only three multiplies and four additions. A masked estimator can then apply these low-complexity masks to error correlations in each subband to generate distortion estimates for the subbands. By applying the low-complexity masks instead of the single weights, a more accurate distortion estimate may be produced (5% error, at lower PSNR, instead of up to 30% error using conventional methods).

For the specific example of FIG. 12, the 5×5 mask of FIG. 11 is thresholded to get five non-zero weights. In general, for other filters (other than the 5,3-filterbank), the mask could be larger or smaller than 5×5. With larger thresholds, the low-complexity mask (FIG. 12) could have more than 5 non-zero weights.

Figure 13:
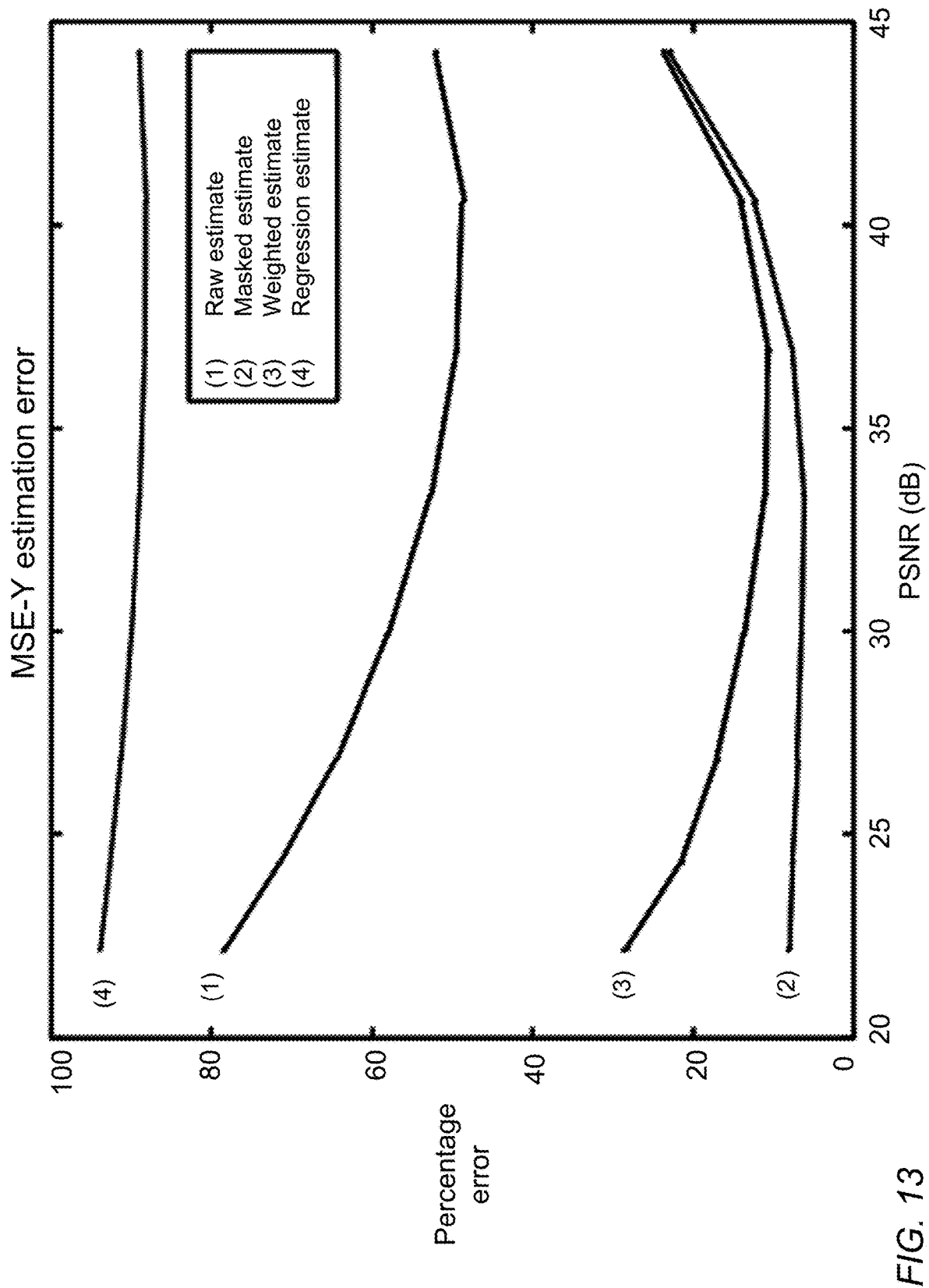
FIG. 13 is a chart that graphically compares MSE estimation error using different methods.

FIG. 13 is a chart that graphically compares MSE estimation error using different methods. In particular, note the improvement at lower PSNR when using the masked estimator (2) that applies masks (in this example, the 5×5 masks of FIG. 11) when compared to conventional methods that use single weights (3).

In some embodiments, the 5×5 masks or the low-complexity masks for the subbands may be stored in a look-up table (LUT) for access by the masked estimator. Alternatively, the masks may be hardcoded as multipliers in an ASIC (application-specific integrated circuit), or otherwise stored.

The masked estimator may, for example, be used in an encoder to determine distortion estimates (MSEs) for the 16 subblocks that represent the seven subbands, which may then be used in estimating the distortion curves for the respective wavelet block. The following is an example algorithm that may be used to estimate the distortion curves for the 16 subblocks (CTUs), in some embodiments:

For each CTU:
1. Get the original CTU (the CTU before encoding) and the reconstructed CTU (the reconstructed CTU may be generated by decoding the encoded CTU and applying an inverse wavelet function)
2. Apply the masked estimator to the original CTU and the reconstructed CTU to get $MSE_{Actual}$ of the CTU ($MSE_{Actual}$ represents the distortion of a wavelet inverse of the biorthogonal subband represented in the CTU). In some embodiments, the masked estimator applies the 5×5 mask for the subband corresponding to the CTU as illustrated in FIG. 11. In some embodiments, the masked estimator applies the low-complexity mask for the subband corresponding to the CTU as illustrated in FIG. 12.
3. Apply quantization step size (qstep) to the unquantized DCT histogram for the CTU to estimate the quantized DCT histogram for the CTU.
4. Estimate distortion $MSE_{Est}$ by determining how many coefficients move between bins of the unquantized and quantized DCT histograms.
5. Compute a correction factor:

$$MSE_{CorrFactor} = MSE_{Actual}/MSE_{Est}$$

Estimate the distortion curves for the 16 subblocks (CTUs):
6. For $CTU_i$:
   a) For each QP=16:6:51 (qsteps are powers of 2)
      i) qstep=$2^{(QP-4)}$
      ii) Apply qstep to unquantized histogram to get quantized histogram
      iii) $D_i(QP)=MSE_{CorrFactor} * MSE_{Est}$ Rate-Distortion Curve Analysis In embodiments of a rate control component as described herein, the quantization parameters for the subblocks in a block may be calculated globally to jointly optimize bandwidth usage and the overall displayed quality of the video data after decoder reconstruction and wavelet synthesis is performed on the target device. Embodiments of the rate control component may implement a method for rate allocation between the subbands in a block that estimates quantization parameters (QPs) for the subblocks in a block (e.g., QPs for the 16 CTUs in a wavelet block (WB)) to minimize wavelet-inverse distortion given a rate bound:

$$\underset{QP_0,\ldots,QP_{15}}{\text{minimize}} \|W^{-1}(WB) - W^{-1}H^{-1}H(WB)\|_2^2, \quad (1)$$

$$\text{subject to} \sum_{n=0}^{15} R_n \leq R_{wbTarget}$$

where $W^{-1}$ is the inverse wavelet transform, H is the HEVC encoding of $CTU_n$ with $QP_n$ for $0<=n<=15$, $H^{-1}$ is the HEVC decoding of encoded $CTU_n$ for $0<=n<=15$, $R_n$ is the number of bits required to HEVC-encode $CTU_n$ with $QP_n$, and $R_{wbTarget}$ is the target rate bound.

Embodiments of the rate control component may implement a method to estimate the global minimizing QPs for a wavelet block in which, for each subblock (CTU) of the wavelet block, a curve is generated (referred to as a rate-distortion curve) that maps the distortion and the number of bits (rate) for that CTU. To generate the rate-distortion curves for the CTUs, a rate curve and a distortion curve may be estimated for each CTU as described above in the sections titled Rate estimation and Distortion estimation. A given point on the rate-distortion curve indicates distortion at a given bit rate for the corresponding CTU. Once the rate-distortion curves for the CTUs are generated, the rate control component finds a point on each curve where the slope is the same for all the rate-distortion curves. The QPs associated with those equally sloped points are the global minimizing QPs for the current wavelet block.

In some embodiments, to find a point on each curve where the slope is the same for all the rate-distortion curves, a bisection search may be used. A bisection search algorithm has been described to find optimal quantizers for wavelet-packet bases (K. Ramchandran, M. Vetterli—Best wavelet packet bases in a Rate-Distortion Sense, IEEE Transactions on Image Processing, April 1993). Although the algorithm cannot be applied directly to HEVC encoding of wavelet subbands, concepts from the research can be exploited to obtain the optimal QPs for a wavelet block.

A first concept relates to setting QPs for independent blocks (CTUs) which are encoded to meet the $R_{wbTarget}$ bound collectively. Optimal QPs occur at Rate-Distortion (RD) points for which the slope is identical across all CTUs. The sum of the rates at these particular RD points is less than (but as close as possible to) $R_{wbTarget}$. The slope of the RD curve is usually denoted by lambda, and the optimal QPs are said to exist at the "equal-slope point" or "equal-lambda point" on the RD curves.

A second concept is that the equal-lambda point can be found by a bisection search that converges in a few iterations. Specifically, for a given lambda value and CTU, the best RD point minimizes the functional J(lambda)=D+ lambda*R, and has slope equal to lambda. Furthermore, for lambda values greater than the optimal equal-lambda point, the sum of the best RD points across CTUs exceeds $R_{wbTarget}$. Conversely, for lambda values less than the equal-lambda point, the sum of the best RD points across CTUs is below $R_{wbTarget}$.

Thus, embodiments may implement a bisection search method to find lambda. The method starts with $lambda_U=0$ and finds ($R_U$, $D_U$) as the sum of rates and distortions across all CTUs with $lambda_U$. Similarly, $lambda_L$=INT_MAX is used to determine ($R_L$, $D_L$). If $R_U=R_{wbTarget}$ (or $R_L=R_{wbTarget}$), the search terminates and the optimal QPs for the wavelet block are those associated with the equal-lambda RD points that summed to $R_U$ (or $R_L$) across all CTUs. Otherwise, the [$lambda_U$, $lambda_L$] interval is refined and the search is repeated.

Applications and Advantages of the Block-Based Low Latency Rate Control Methods

In some embodiments of an encoding system, the block-based low latency rate control methods described herein may be used to determine QPs for encoding every pixel block processed by the system. In these embodiments, the CTU rate-distortion curves are generated and used to determine CTU-level QPs for every block as described herein. This method adapts quickly to a fluctuating channel, minimizes packet loss, and preserves visual quality. An efficient bisection search is used to estimate the optimal QPs for all the CTUs in a wavelet block from the CTU rate-distortion curves without getting stuck in local minima. A masked estimator is used in determining the distortion curves that significantly improves MSE estimation over conventional methods. An unquantized DCT histogram for each CTU that contains all of the quantized histograms for the CTU is leveraged to efficiently determine the rate and distortion curves used to estimate the optimal QPs. In addition, the block-based low latency rate control methods may require less memory (e.g., memory for buffering) than conventional rate control methods that determine rate at the strip or frame level.

In some embodiments, the wireless interface may be monitored for performance. When the wireless channel is good (e.g., available bandwidth is above a threshold), strip-level QPs may be determined, for example from aggregated CTU rate-distortion curves generated by the rate control component using the methods described herein, and the strip-level QPs may be used to encode the subbands across the strip. The QPs can be modulated at the CTU level based on visual heuristics and the CTU rate-distortion curves. Without the CTU rate-distortion curves, the strip rate may fluctuate by ~25%. When the wireless channel is not good (e.g., available bandwidth is below a threshold), the strip-level QP is not used, as busy areas in the strip may result in packet drops. Instead, the CTU rate-distortion curves are generated and used to determine CTU-level QPs for every block in a strip as described herein. This method adapts quickly to a fluctuating channel, minimizes packet loss, and preserves visual quality.

Example VR/MR system

Figure 14:
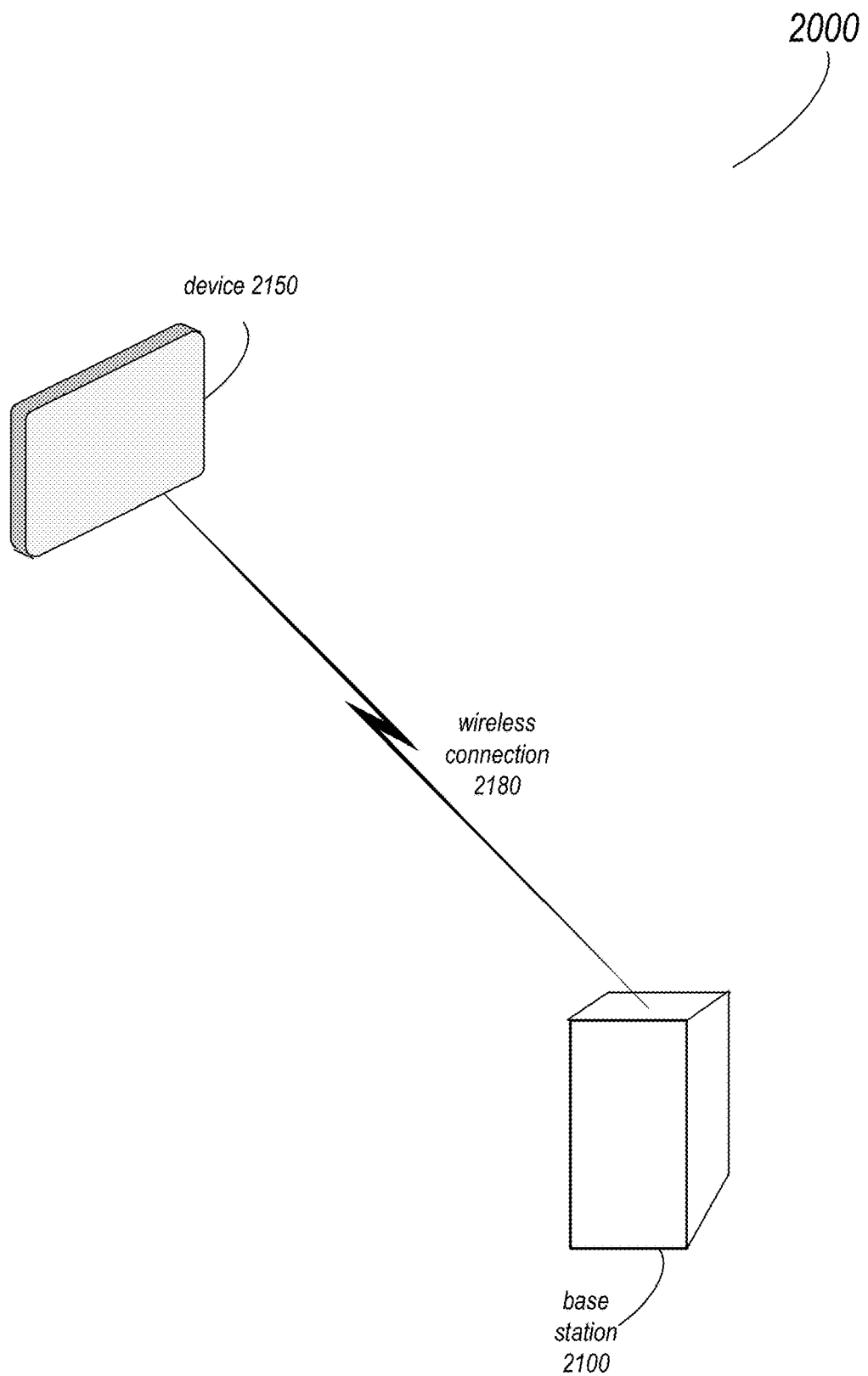
FIG. 14 illustrates an example VR/MR system that may implement a video encoding system, according to at least some embodiments.

FIG. 14 illustrates an example VR/MR system 2000 that may implement a video encoding system, according to at least some embodiments. A VR/MR system 2000 may include at least one device 2150 (e.g., a notebook or laptop computer, pad or tablet device, smartphone, hand-held computing device or an HMD such as a headset, helmet, goggles, or glasses that may be worn by a user) and a computing device 2100 (referred to herein as a base station). The base station 2100 renders VR or MR frames including virtual content, encodes the frames, and transmits the encoded frames over a wireless connection 2180 to the device 2150 for decoding and display by the device 2150.

The base station 2100 and device 2150 may each include wireless communications technology that allows the base station 2100 and device 2150 to communicate and exchange data via the wireless connection 2180. Commercial (e.g., Wi-Fi, Bluetooth, etc.) or proprietary wireless communications technologies may be used in various embodiments.

In some embodiments, the device 2150 may include sensors that collect information about the user's environment (e.g., video, depth information, lighting information, etc.) and/or about the user (e.g., the user's expressions, eye movement, gaze direction, hand gestures, etc.). The device 2150 may transmit at least some of the information collected by sensors to the base station 2100 via wireless connection 2180. The base station 2100 may render frames for display by the device 2150 that include virtual content based at least in part on the various information obtained from the sensors, encode the frames, and transmit the encoded frames to the device 2150 for decoding and display to the user via the wireless connection 2180. To encode and transmit the frames, the base station 2100 may implement a video encoding system as illustrated in FIGS. 1 through 13.

Figure 15:
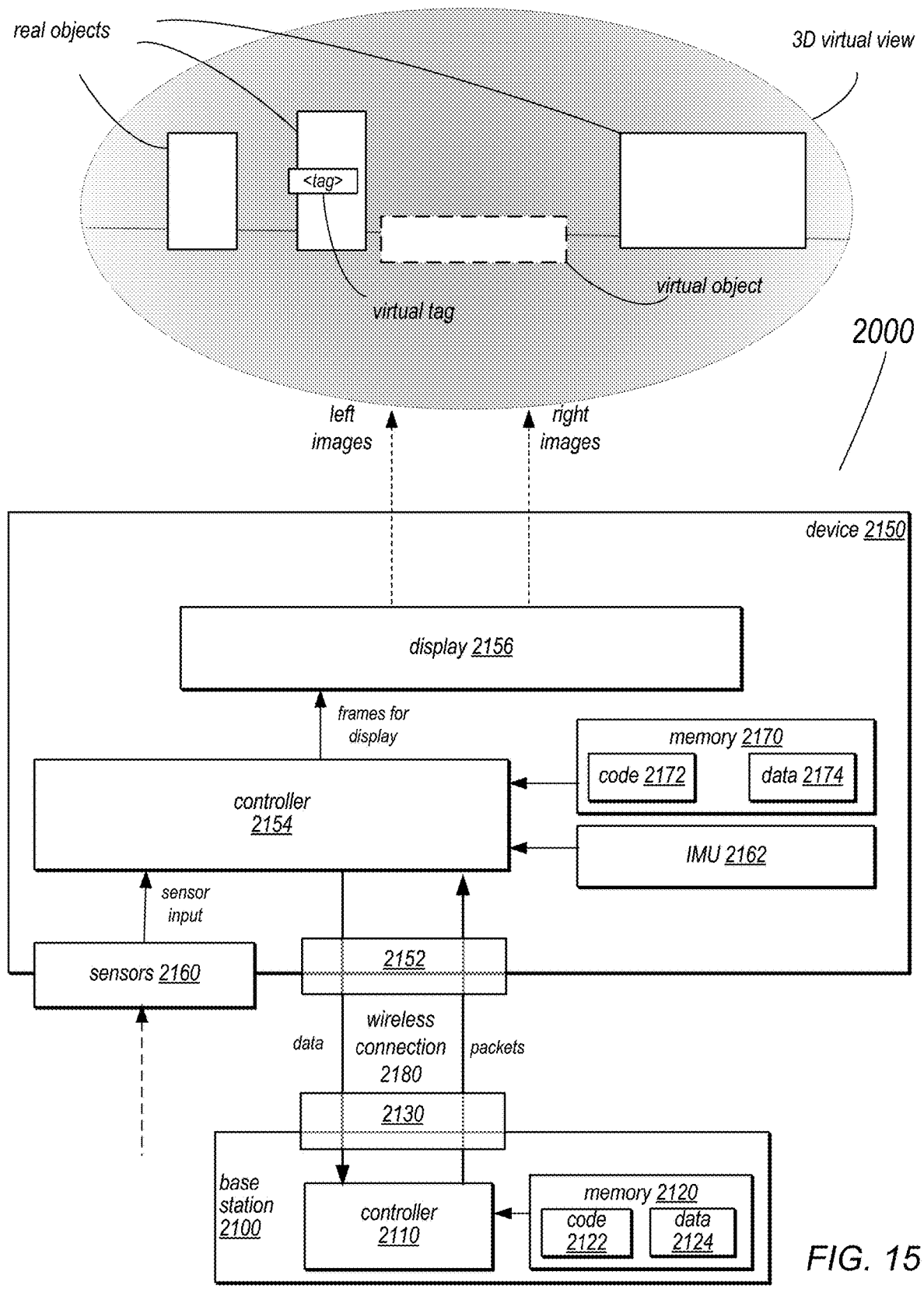
FIG. 15 is a block diagram illustrating components of a VR/MR system as illustrated in FIG. 14, according to at least some embodiments.

FIG. 15 is a block diagram illustrating functional components of and processing in an example VR/MR system as illustrated in FIG. 14, according to some embodiments. Device 2150 may be, but is not limited to, a notebook or laptop computer, pad or tablet device, smartphone, hand-held computing device or an HMD such as a headset, helmet, goggles, or glasses that may be worn by a user. Device 2150 may include a display 2156 component or subsystem that may implement any of various types of virtual or augmented reality display technologies. For example, an HMD device 2150 may be a near-eye system that displays left and right images on screens in front of the user's eyes that are viewed by a subject, such as DLP (digital light processing), LCD (liquid crystal display) and LCoS (liquid crystal on silicon) technology VR systems. As another example, an HMD device 2150 may be a direct retinal projector system that scans left and right images, pixel by pixel, to the subject's eyes. To scan the images, left and right projectors generate beams that are directed to left and right reflective components (e.g., ellipsoid mirrors) located in front of the user's eyes; the reflective components reflect the beams to the user's eyes. To create a three-dimensional (3D) effect, virtual content at different depths or distances in the 3D virtual view are shifted left or right in the two images as a function of the triangulation of distance, with nearer objects shifted more than more distant objects.

Device 2150 may also include a controller 2154 configured to implement device-side functionality of the VR/MR system 2000 as described herein. In some embodiments, device 2150 may also include memory 2170 configured to store software (code 2172) of the device component of the VR/MR system 2000 that is executable by the controller 2154, as well as data 2174 that may be used by the software when executing on the controller 2154. In various embodiments, the controller 2154 may be a uniprocessor system including one processor, or a multiprocessor system including several processors (e.g., two, four, eight, or another suitable number). The controller 2154 may include central processing units (CPUs) configured to implement any suitable instruction set architecture, and may be configured to execute instructions defined in that instruction set architecture. For example, in various embodiments the controller 2154 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. The controller 2154 may employ any microarchitecture, including scalar, superscalar, pipelined, superpipelined, out of order, in order, speculative, non-speculative, etc., or combinations thereof. The controller 2154 may include circuitry to implement microcoding techniques. The controller 2154 may include one or more processing cores each configured to execute instructions. The controller 2154 may include one or more levels of caches, which may employ any size and any configuration (set associative, direct mapped, etc.). In some embodiments, the controller 2154 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, the controller 2154 may include one or more other components for processing and rendering video and/or images, for example image signal processors (ISPs), encoder/decoders (codecs), etc. In some embodiments, controller 2154 may include at least one system on a chip (SOC).

The memory 2170 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, sensors 2160 may include, but are not limited to, one or more gaze tracking sensors (e.g., IR cameras with an IR illumination source) that may be used to track position and movement of the user's eyes. In some embodiments, there may be two gaze tracking sensors, with each gaze tracking sensor tracking a respective eye. In some embodiments, the information collected by the gaze tracking sensors may be used to adjust the rendering of images by the base station 2100, and/or to adjust the projection of the images by the projection system of the device 2150, based on the direction and angle at which the user's eyes are looking. For example, in some embodiments, content of the images in a region around the location at which the user's eyes are currently looking may be rendered with more detail and at a higher resolution than content in regions at which the user is not looking, which allows available processing time for image data to be spent on content viewed by the foveal regions of the eyes rather than on content viewed by the peripheral regions of the eyes. Similarly, content of images in regions at which the user is not looking may be compressed more than content of the region around the point at which the user is currently looking. In some embodiments there may be two gaze tracking sensors located on an inner surface of the device 2150 at positions such that the sensors have views of respective ones of the user's eyes. However, in various embodiments, more or fewer gaze tracking sensors may be used, and gaze tracking sensors may be positioned at other locations. In an example non-limiting embodiment, each gaze tracking sensor may include an IR light source and IR camera, for example a 400×400 pixel count camera with a frame rate of 120 FPS or greater, HFOV of 70 degrees, and with a working distance of 10 millimeters (mm) to 80 mm.

In some embodiments, the device 2150 may include at least one inertial-measurement unit (IMU) 2162 configured to detect position, orientation, and/or motion of the device 2150, and to provide the detected position, orientation, and/or motion data to the controller 2154 of the device 2150 and/or to the base station 2100.

Device 2150 may also include a wireless interface 2152 configured to communicate with an external base station 2100 via a wireless connection 2180 to send sensor inputs to the base station 2100 and to receive compressed rendered frames, strips, or tiles from the base station 2100. Various commercial (e.g., Wi-Fi, Bluetooth, etc.) or proprietary wireless communications technologies may be used in embodiments.

The base station 2100 may be an external device (e.g., a computing system, game console, etc.) that is communicatively coupled to device 2150 via a wireless interface 2180. The base station 2100 may include one or more of various types of processors (e.g., SOCs, CPUs, ISPs, GPUs, codecs, and/or other components) for rendering, filtering, encoding, and transmitting video and/or images. The base station 2100 may render frames (each frame including a left and right image) that include virtual content based at least in part on the various inputs obtained from the sensors 2160 via the wireless connection 2180, filter and compress the rendered frames (or strips of the frames) using a video encoding system as described herein, and transmit the compressed frames or strips to the device 2150 for display.

Base station 2100 may be or may include any type of computing system or computing device, such as a desktop computer, notebook or laptop computer, pad or tablet device, smartphone, hand-held computing device, game controller, game system, and so on. Base station 2100 may include a controller 2110 comprising one or more processors that implement base-side functionality of the VR/MR system 2000 including the video encoding system as described herein. Base station 2100 may also include memory 2120 configured to store software (code 2122) of the base station component of the VR/MR system 2000 that is executable by the base station controller 2110, as well as data 2124 that may be used by the software when executing on the controller 2110.

In various embodiments, the base station controller 2110 may be a uniprocessor system including one processor, or a multiprocessor system including several processors (e.g., two, four, eight, or another suitable number). The controller 2110 may include central processing units (CPUs) configured to implement any suitable instruction set architecture and may be configured to execute instructions defined in that instruction set architecture. For example, in various embodiments the controller 2110 may include general-purpose or embedded processors implementing any of a variety of instruction set architectures (ISAs), such as the x86, PowerPC, SPARC, RISC, or MIPS ISAs, or any other suitable ISA. In multiprocessor systems, each of the processors may commonly, but not necessarily, implement the same ISA. The controller 2110 may employ any microarchitecture, including scalar, superscalar, pipelined, superpipelined, out of order, in order, speculative, non-speculative, etc., or combinations thereof. Controller 2110 may include circuitry to implement microcoding techniques. The controller 2110 may include one or more processing cores each configured to execute instructions. The controller 2110 may include one or more levels of caches, which may employ any size and any configuration (set associative, direct mapped, etc.). In some embodiments, the controller 2110 may include at least one graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, the controller 2110 may include one or more other components for processing, rendering, filtering, and encoding video and/or images as described herein, for example one or more of various types of integrated circuits (ICs), image signal processors (ISPs), encoder/decoders (codecs), etc. In some embodiments, the controller 2110 may include at least one system on a chip (SOC).

The base station memory 2120 may include any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

Base station 2100 may also include one or more wireless technology interfaces 2130 configured to communicate with device 2150 via a wireless connection 2180 to receive sensor inputs from the device 2150 and send compressed frames, strips, or tiles from the base station 2100 to the device 2150. In some embodiments, the wireless technology interfaces 2130 may support multiple devices 2150 communicating with the base station 2100 at the same time to thus enable multiple users to use the system 2000 at the same time in a co-located environment. Various commercial (e.g., Wi-Fi, Bluetooth, etc.) or proprietary wireless communications technologies may be used in embodiments.

In some embodiments, the base station 2100 may be configured to render and transmit frames to the device 2150 to provide a 3D virtual view for the user based at least in part on sensor 2160 inputs received from the device 2150. In some embodiments, the virtual view may include renderings of the user's environment, including renderings of real objects in the user's environment, based on video captured by one or more scene cameras (e.g., RGB (visible light) video cameras) that capture high-quality, high-resolution video of the user's environment in real time for display. In some embodiments, the virtual view may also include virtual content (e.g., virtual objects, virtual tags for real objects, avatars of the user, etc.) rendered and composited with the projected 3D view of the user's real environment by the base station 2100.

While not shown in FIGS. 14 and 15, in some embodiments the VR/MR system 2000 may include one or more other components. For example, the system may include a cursor control device (e.g., mouse) for moving a virtual cursor in the 3D virtual view to interact with virtual content. While FIGS. 14 and 15 show a single device 2150, in some embodiments the VR/MR system 2000 may support multiple devices 2150 communicating with the base station 2100 at the same time to thus enable multiple users to use the system at the same time in a co-located environment.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An encoding system, comprising:
   a wavelet transform component comprising one or more processors configured to:
      apply a wavelet transform to input blocks to decompose the input blocks into a plurality of subbands;
      for each input block, generate a wavelet block comprising a plurality of subblocks, wherein each subblock includes data for one of the subbands;
   a rate control component comprising one or more processors configured to, for each wavelet block generated by the wavelet transform component, determine quantization parameters (QPs) for the subblocks of the wavelet block; and
   an encoding pipeline comprising one or more processors configured to, for each wavelet block generated by the wavelet transform component:
      apply an encoding technique to each subblock of the wavelet block using a respective QP generated by the rate control component to generate a compressed subblock; and
      generate a distortion estimate for the subblock;
   wherein, to generate a distortion estimate for a subblock, a weight mask for the subband represented in the subblock is applied to the subblock and a reconstruction of the compressed subblock to estimate a mean square error (MSE) for the subblock, wherein the MSE indicates distortion of a wavelet inverse of the subband represented in the compressed subblock, wherein the weight mask computes intra-subband error energy and thus includes intra-subband correlations in the distortion estimate.

2. The encoding system as recited in claim 1, wherein the weight mask is an N×N mask.

3. The encoding system as recited in claim 2, where N=5.

4. The encoding system as recited in claim 1, wherein the weight mask is a low complexity mask generated by thresholding an N×N mask.

5. The encoding system as recited in claim 4, wherein the low-complexity mask comprises at least five non-zero weights including weights at center, above center, below center, left of center, and right of center of the mask.

6. The encoding system as recited in claim 1, wherein the wavelet transform component implements a biorthogonal wavelet transform that decomposes the pixel blocks into seven subbands (LLLL, LLLH, LLHL, LLHH, LH, HL, and HH).

7. The encoding system as recited in claim 1, wherein the wavelet transform component implements an n-level wavelet transform that decomposes the pixel blocks into 3n+1 subbands.

8. The encoding system as recited in claim 1, wherein weight masks for each of the subbands are stored in a look-up table or hardcoded as multipliers in an ASIC.

9. The encoding system as recited in claim 1, wherein the encoding technique is HEVC (high-efficiency video coding).

10. The encoding system as recited in claim 1, wherein the QPs for the subblocks of the wavelet block are determined based at least in part on stored rate control statistics for a co-located block in a previous frame, wherein the rate control statistics include rate-distortion curves for subblocks of the co-located block that were determined based at least in part on distortion estimates for the subblocks of the co-located block and QPs for the subblocks of the co-located block that were determined based at least in part on the rate-distortion curves for the subblocks of the co-located block.

11. The encoding system as recited in claim 10, wherein the rate control component is further configured to:
   for each subblock of the wavelet block:
      generate a rate curve for the subblock based on a histogram of unquantized discrete cosine transform (DCT) coefficients for the subblock and bit count statistics for the subblock;
      generate a distortion curve based on the histogram of unquantized DCT coefficients and the distortion estimate for the subblock; and
      generate a rate-distortion curve based on the rate curve and the distortion curve for the subblock;
   estimate optimal QPs for the subblocks of the wavelet block based on the rate-distortion curves for the subblocks and a rate bound for the wavelet block; and
   store at least the rate-distortion curves and the optimal QPs as rate control statistics for the wavelet block.

12. The encoding system as recited in claim 11, wherein, to estimate optimal QPs for the subblocks of the wavelet block based on the rate-distortion curves for the subblocks and a rate bound for the wavelet block, a bisection search is applied to the rate-distortion curves to find a point on each rate-distortion curve with a same slope, wherein QPs associated with the points are selected as the optimal QPs for the respective subblocks of the wavelet block.

13. The encoding system as recited in claim 1, further comprising a wireless interface configured to transmit the compressed subblocks over a wireless connection to a receiving device.

14. A method, comprising:
   performing, by one or more processors:
      applying a wavelet transform to an input block to decompose the input block into a plurality of subbands;
      generating a wavelet block comprising a plurality of subblocks, wherein each subblock includes frequency data for one of the subbands;
      determining quantization parameters (QPs) for the subblocks of the wavelet block; and for each subblock of the wavelet block:
applying an encoding technique to the subblock using a respective QP to generate a compressed subblock; and
generating a distortion estimate for the subblock;
wherein generating a distortion estimate for a subblock comprises applying a weight mask for the subband represented in the subblock to the subblock and a reconstruction of the compressed subblock to estimate a mean square error (MSE) for the subblock, wherein the MSE indicates distortion of a wavelet inverse of the subband represented in the compressed subblock, wherein the weight mask computes intra-subband error energy and thus includes intra-subband correlations in the distortion estimate.

15. The method as recited in claim 14, wherein the weight mask is a low complexity mask generated by thresholding an N×N mask, wherein the low-complexity mask comprises at least five non-zero weights including weights at center, above center, below center, left of center, and right of center of the mask.

16. The method as recited in claim 14, wherein the wavelet transform component implements an n-level wavelet transform that decomposes the pixel blocks into 3n+1 subbands.

17. The method as recited in claim 14, wherein determining quantization parameters (QPs) for the subblocks of the wavelet block comprises determining the QPs for the subblocks of the wavelet block from stored rate control statistics for a co-located block in a previous frame, wherein the rate control statistics include rate-distortion curves for subblocks of the co-located block that were determined based at least in part on distortion estimates for the subblocks of the co-located block and QPs for the subblocks of the co-located block that were determined based at least in part on the rate-distortion curves for the subblocks of the co-located block.

18. The method as recited in claim 17, further comprising:
for each subblock of the wavelet block:
generating a rate curve for the subblock based on a histogram of unquantized discrete cosine transform (DCT) coefficients for the subblock and bit count statistics for the subblock;
generating a distortion curve based on the histogram of unquantized DCT coefficients and the distortion estimate for the subblock; and
generating a rate-distortion curve based on the rate curve and the distortion curve for the subblock;
estimating optimal QPs for the subblocks of the wavelet block based on the rate-distortion curves for the subblocks and a rate bound for the wavelet block; and
storing at least the rate-distortion curves and the optimal QPs as rate control statistics for the wavelet block.

19. A system, comprising:
a device comprising one or more processors and a display subsystem;
a base station comprising one or more processors configured to:
apply a wavelet transform to pixel blocks from a current video frame to decompose the blocks into a plurality of subbands;
for each pixel block, generate a wavelet block comprising a plurality of subblocks, each subblock comprising data for one of the subbands;
for each wavelet block:
determine quantization parameters (QPs) for the subblocks of the wavelet block based at least in part on stored rate control statistics for a co-located block of a previous video frame;
apply an encoding technique to each subblock of the wavelet block, wherein the encoding technique uses the determined QPs for the subblocks of the wavelet block to generate compressed subblocks;
generate encoding statistics including a distortion estimate for each subblock of the wavelet block, wherein, to generate the distortion estimate for the subblock, a weight mask for a subband represented in the subblock is applied to the subblock and a reconstruction of the compressed subblock to estimate a mean square error (MSE) for the subblock, wherein the MSE indicates distortion of a wavelet inverse of the subband represented in the compressed subblock, wherein the weight mask computes intra-subband error energy and thus includes intra-subband correlations in the distortion estimate;
generate rate control statistics for the wavelet block based at least in part on the encoding statistics for the subblocks of the wavelet block; and
store the rate control statistics for the wavelet block; and
transmit compressed wavelet blocks over a wireless connection to the device;
wherein the one or more processors of the device are configured to:
decompress compressed wavelet blocks received from the base station;
perform wavelet synthesis on the decompressed wavelet blocks to reconstruct the pixel data for the video frame; and
provide the reconstructed pixel data to the display subsystem for display.

20. The system as recited in claim 19, wherein the device is a head-mounted device.

* * * * *